United States Patent [19]

Kurokawa et al.

[11] Patent Number: 5,048,962

[45] Date of Patent: Sep. 17, 1991

[54] OPTICAL GYRO, SIGNAL PROCESSING APPARATUS FOR THE SAME AND METHOD OF DRIVING PHASE MODULATOR USED IN THE SAME

[75] Inventors: Akihiro Kurokawa; Yoshiaki Hayakawa; Naoshi Murayama, all of Kamakura, Japan

[73] Assignee: Mitsubishi Precision Co., Ltd., Tokyo, Japan

[21] Appl. No.: 495,558

[22] Filed: Mar. 19, 1990

[30] Foreign Application Priority Data

May 15, 1989 [JP] Japan .................................. 1-121236

[51] Int. Cl.[5] ............................................ G01C 19/72
[52] U.S. Cl. .................................... 356/350; 332/144
[58] Field of Search ................. 356/350, 345; 332/144

[56] References Cited

U.S. PATENT DOCUMENTS 4,765,739 8/1988 Koizumi et al. ..................... 356/350

FOREIGN PATENT DOCUMENTS 0074410 3/1989 Japan .
0308915 12/1989 Japan .

Primary Examiner—Samuel Turner
Attorney, Agent, or Firm—Townsend & Townsend

[57] ABSTRACT

An optical gyro includes: an optical propagation path in cooperation with a rotation axis, for propagating a pair of light beams therethrough simultaneously clockwise and counterclockwise, respectively, and causing a phase difference of light based on Sagnac effect; an optical system optically coupled to the optical propagation path, for effecting a generation, a distribution or coupling, a polarization, a frequency shift and a phase modulation of light beams and transducing a light beam indicating the phase difference of light into a corresponding electric signal to output a photoelectric output signal; and a signal processing circuit operatively connected to the optical system. The signal processing circuit effects a digital demodulation for the photoelectric output signal to obtain a signal proportional to an angular velocity with respect to the rotation axis, thereby realizing a stable phase modulation and an improvement in characteristics of the optical gyro. Also, it is possible to expand a maximum range of detection of the input angular velocity.

18 Claims, 14 Drawing Sheets

Fig. 3b

| $\phi_s$ (rad) | NOR. DEM. OUT. 101 | NOR. DEM. OUT. 102 |
|---|---|---|
| $-\pi < \sim < -\pi/2$ | − | − |
| $-\pi/2$ | − | 0 |
| $-\pi/2 < \sim < 0$ | − | + |
| 0 | 0 | + |
| $0 < \sim < \pi/2$ | + | + |
| $\pi/2$ | + | 0 |
| $\pi/2 < \sim < \pi$ | + | − |

Fig. 4b

| $\phi_s$ [rad] | COMPUTED VALUE (BY CCT 19 OR UNIT 130) |
|---|---|
| $-\pi < \sim < -3/4\pi$ | $-\pi + |\tan[K\omega - 2\pi nL(f_{A1}-f_{A2})/C]|$ |
| $-3/4\pi \leqq \sim < -\pi/2$ | $-\pi/2 - |\cot[K\omega - 2\pi nL(f_{A1}-f_{A2})/C]|$ |
| $-\pi/2 \leqq \sim < -\pi/4$ | $-\pi/2 + |\cot[K\omega - 2\pi nL(f_{A1}-f_{A2})/C]|$ |
| $-\pi/4 \leqq \sim < 0$ | $- |\tan[K\omega - 2\pi nL(f_{A1}-f_{A2})/C]|$ |
| $0 \leqq \sim \leqq \pi/4$ | $|\tan[K\omega - 2\pi nL(f_{A1}-f_{A2})/C]|$ |
| $\pi/4 < \sim \leqq \pi/2$ | $\pi/2 - |\cot[K\omega - 2\pi nL(f_{A1}-f_{A2})/C]|$ |
| $\pi/2 < \sim \leqq 3/4\pi$ | $\pi/2 + |\cot[K\omega - 2\pi nL(f_{A1}-f_{A2})/C]|$ |
| $3/4\pi < \sim < \pi$ | $\pi - |\tan[K\omega - 2\pi nL(f_{A1}-f_{A2})/C]|$ |

Fig. 4c

| $\phi_s$ [rad] | COMPUTED VALUE (BY CCT 19 OR UNIT 130) |
|---|---|
| $-\pi < \sim < -3/4\pi$ | $-\pi + \arctan\|\tan[K\omega - 2\pi nL(f_{A1} - f_{A2})/C]\|$ |
| $-3/4\pi \leq \sim \leq -\pi/2$ | $-\pi/2 - \text{arccot}\|\cot[K\omega - 2\pi nL(f_{A1} - f_{A2})/C]\|$ |
| $-\pi/2 \leq \sim \leq -\pi/4$ | $-\pi/2 + \text{arccot}\|\cot[K\omega - 2\pi nL(f_{A1} - f_{A2})/C]\|$ |
| $-\pi/4 \leq \sim < 0$ | $-\arctan\|\tan[K\omega - 2\pi nL(f_{A1} - f_{A2})/C]\|$ |
| $0 \leq \sim \leq \pi/4$ | $\arctan\|\tan[K\omega - 2\pi nL(f_{A1} - f_{A2})/C]\|$ |
| $\pi/4 < \sim \leq \pi/2$ | $\pi/2 - \text{arccot}\|\cot[K\omega - 2\pi nL(f_{A1} - f_{A2})/C]\|$ |
| $\pi/2 < \sim \leq 3/4\pi$ | $\pi/2 + \text{arccot}\|\cot[K\omega - 2\pi nL(f_{A1} - f_{A2})/C]\|$ |
| $3/4\pi < \sim < \pi$ | $\pi - \arctan\|\tan[K\omega - 2\pi nL(f_{A1} - f_{A2})/C]\|$ |

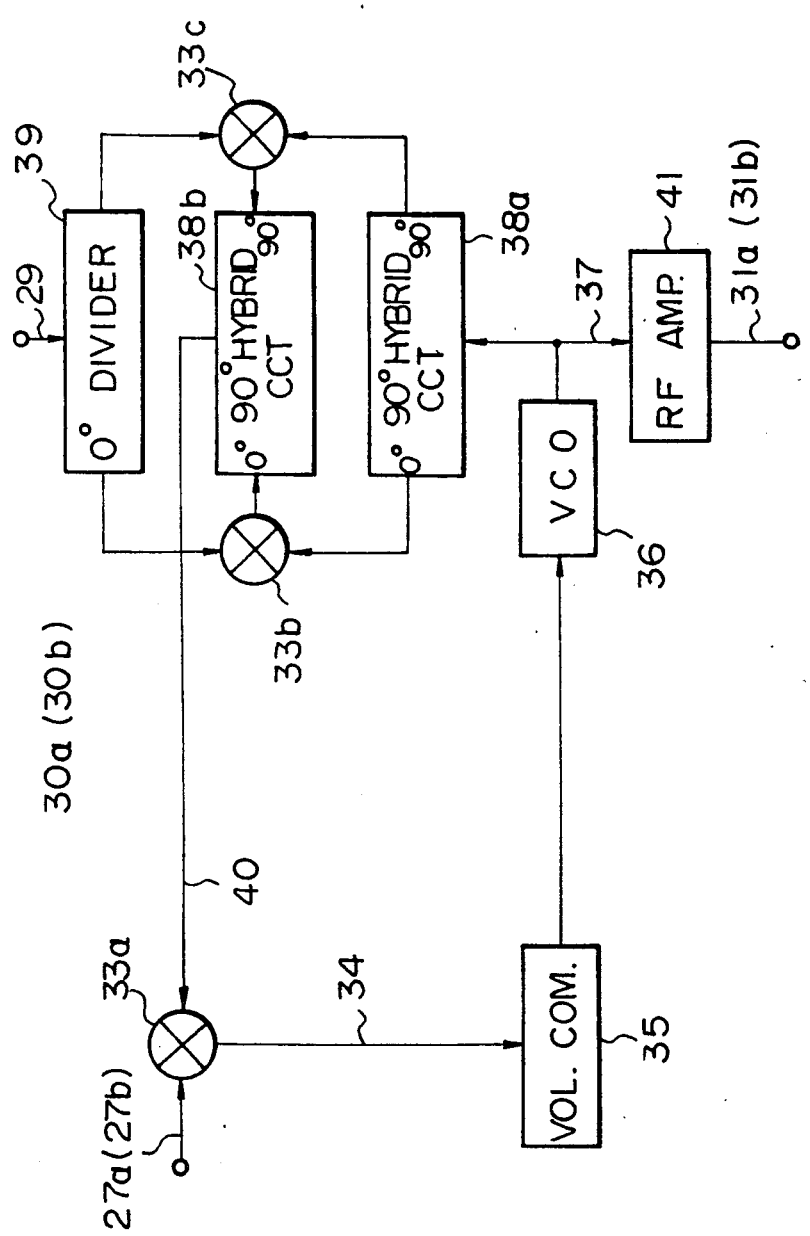

OPTICAL GYRO, SIGNAL PROCESSING APPARATUS FOR THE SAME AND METHOD OF DRIVING PHASE MODULATOR USED IN THE SAME

BACKGROUND OF THE INVENTION

1. Field of the Invention

The present invention relates to an optical gyro and a technique of driving the optical gyro. More particularly, it relates to a constitution of an optical gyro in which light having a constant wavelength is propagated simultaneously clockwise and counterclockwise through an optical propagation path such as an optical fiber in cooperation with a rotation axis and then a phase difference of the light based on Sagnac effect is detected to obtain a signal proportional to an angular velocity with respect to the rotation axis, a signal processing apparatus for the optical gyro and a method of driving a phase modulator used in the optical gyro.

2. Description of the Related Art

Various approaches to drive an optical gyro have been developed. As an example, a frequency shift optical fiber gyro is known, which includes a phase modulator and a pair of acousto-optic modulators provided in an optical system optically coupled to a propagation path of an optical fiber through which light is propagated simultaneously clockwise and counterclockwise, and a signal processing circuit for analogically processing a photoelectric output signal obtained from the optical system. The signal processing circuit includes a synchronization detecting circuit responsive to the photoelectric output signal and a number of oscillating circuits, e.g., a voltage controlled oscillating (VCO) circuit, for generating drive signals of the above modulators and carries out an analog demodulation of the photoelectric output signal.

As described later in detail, however, the driving technique employing the analog demodulation has a number of drawbacks. For example, when drive frequencies for the pair of acousto-optic modulators are not identical to each other, an equivalent error of an angular velocity occurs, so that it is impossible to obtain a signal in accurate proportion to the angular velocity. Also, where the drive signals for the modulators are produced by separate oscillating circuits, the drive frequencies easily fluctuate resulting in a lowering in a bias stability of the gyro. Furthermore, due to a fluctuation in a quantity of incoherent light of a light beam in the optical system, a fluctuation in a maximum phase shift of the phase modulator, or the like, characteristics of the gyro are deteriorated. A problem also occurs in that a detectable maximum angular velocity is limited to a narrow range.

As another example, an optical fiber gyro using only a phase modulation is known, which includes a phase modulator provided in an optical system as above mentioned and a signal processing circuit for effecting an analog demodulation of a photoelectric output signal obtained from the optical system. In this case, the signal processing circuit includes an analog multiplier responsive to the photoelectric output signal and a drive signal for the phase modulator and a number of filters, e.g., a low pass filter for filtering an output of the analog multiplier.

Since the signal processing circuit employs the analog demodulation as well as the above example, like problems occurs. For example, where offset voltages occurring in the analog multiplier and low pass filter fluctuate, the bias stability of the gyro is lowered. Other problems will be described later in detail.

Also, in a known method of driving a phase modulator used in an optical fiber gyro, the phase modulator is modulated at a certain resonant frequency defined by dimensions of a member constituting the phase modulator. On the other hand, the phase modulation is preferably carried out at an eigenfrequency of an optical propagation path to remove influences due to harmonics contained in the phase modulation signal. Accordingly, it is necessary to conform the resonant frequency to the eigenfrequency.

As will be described later, however, the work imposes restrictions on the dimensions of the member constituting the phase modulator. As a result, where an optical fiber is wound on the member on which such restrictions are imposed, a radiation loss occurs in the optical fiber resulting in a deterioration in a signal-to-noise (S/N) ratio of a photoelectric output signal. Also, due to an error in manufacture of the member, it becomes difficult to conform the resonant frequency to the eigenfrequency.

SUMMARY OF THE INVENTION

A main object of the present invention is to provide an optical gyro which can obtain an output signal in accurate proportion to an input angular velocity.

Another object of the present invention is to realize a stable phase modulation and thus improve characteristics of the optical gyro, while reducing a frequency fluctuation in a drive signal for an acousto-optic modulator and preventing an occurrence of offset voltage.

Still another object of the present invention is to expand a maximum range of detection of the input angular velocity of the optical gyro.

Still further another object of the present invention is to reduce a radiation loss in an optical propagation path and thus improve a signal-to-noise ratio of a photoelectric output signal, while enabling a phase modulation at an eigenfrequency of the optical propagation path irrespective of an error in manufacture of a phase modulator.

According to a fundamental aspect of the present invention, there is provided an optical gyro including: an optical propagation path in cooperation with a rotation axis, for propagating a pair of light beams therethrough simultaneously clockwise and counterclockwise, respectively, and causing a phase difference of light based on Sagnac effect; an optical system optically coupled to the optical propagation path, for effecting a generation, a distribution or coupling, a polarization, a frequency shift and a phase modulation of light beams and transducing a light beam indicating the phase difference of light into a corresponding electric signal to output a photoelectric output signal; and a signal processing circuit operatively connected to the optical system, for taking signal components of a same frequency as, a frequency twice and a frequency four times a phase modulation frequency out of the photoelectric output signal and digitally processing the signal components to generate drive signals for the frequency shift and phase modulation and obtain a signal proportional to an angular velocity with respect to the rotation axis.

According to another aspect of the present invention, there is provided an apparatus for effecting a signal processing for an optical gyro including: a first heterodyne mixer for taking a signal component of a same frequency as a drive frequency fm of a phase modulator constituting the optical gyro out of a phase-modulated photoelectric output signal indicating a rotation angular velocity and converting the signal component to a signal of a frequency Δ fm to output a first analog signal; a second heterodyne mixer for taking a signal component of a frequency 2 fm out of the photoelectric output signal and converting the signal component to a signal of the frequency Δ fm to output a second analog signal; a third heterodyne mixer for taking a signal component of a frequency 4 fm out of the photoelectric output signal and converting the signal component to a signal of the frequency Δ fm to output a third analog signal; a fourth heterodyne mixer for converting a fifth analog signal having a same frequency as a drive signal for the phase modulator and synchronizing in phase therewith to a signal of the frequency Δ fm to output a fourth analog signal; an analog/digital converter for converting the first to third analog signals to a first digital signal; a timing pulse generation unit for outputting a second digital signal in phase synchronization with the fourth analog signal and connected to the analog/digital converter, and a third digital signal in phase synchronization with the fourth analog signal; a cosine/sine generation unit for outputting fourth and fifth digital signals in phase synchronization with the third digital signal and shifted in phase by 90° from each other; a first digital multiplication unit for effecting a multiplication of the first and fourth digital signals to output a sixth digital signal; a second digital multiplication unit for effecting a multiplication of the first and fifth digital signals to output a seventh digital signal; a polarity discrimination unit for discriminating a polarity of the rotation angular velocity based on the sixth and seventh digital signals to output an eighth digital signal; a phase modulation index computation unit responsive to the sixth and seventh digital signals, for outputting a ninth digital signal to keep constant a ratio of each amplitude of the signal components of frequencies 2 fm and 4 fm taken out of the photoelectric output signal, and a tenth digital signal corresponding to the phase modulation index; an angular velocity computation unit for outputting an eleventh digital signal proportional to the rotation angular velocity based on the sixth, seventh, eighth and tenth digital signals; and a reference signal generating circuit for outputting a sixth analog signal having an amplitude corresponding to the ninth digital signal and connected to the phase modulator, the fifth analog signal in synchronization in frequency and phase with the sixth analog signal and connected to the fourth heterodyne mixer, a twelfth digital signal in synchronization in frequency and phase with the sixth analog signal and connected to the first and fourth heterodyne mixers, a thirteenth digital signal in synchronization in frequency and phase with the sixth analog signal and connected to the second heterodyne mixers, and a fourteenth digital signal in synchronization in frequency and phase with the sixth analog signal and connected to the third heterodyne mixers.

Also, according to another aspect of the present invention, there is provided a signal processing apparatus for an optical gyro in which light is propagated simultaneously clockwise and counterclockwise through an optical propagation path in cooperation with a rotation axis and then a phase difference of the light based on Sagnac effect is detected to obtain a photoelectric output signal, the signal processing apparatus including: a first synchronization detecting circuit having a function of automatically changing sensitivity for synchronization detection, for outputting information on the sensitivity as a first digital signal and taking a signal component of a same frequency as the phase modulation frequency out of the photoelectric output signal to output first and second analog signals; a second synchronization detecting circuit for taking a signal component of a frequency twice the phase modulation frequency out of the photoelectric output signal to output third and fourth analog signals; a third synchronization detecting circuit for taking a signal component of a frequency four times the phase modulation frequency out of the photoelectric output signal to output fifth and sixth analog signals; an analog/digital converter for converting the first to sixth analog signals to a second digital signal; a computation/control circuit responsive to the first and second digital signals, for outputting a third digital signal to keep constant a ratio of absolute values of each amplitude of the signal components of frequencies twice and four times the phase modulation frequency, fourth and fifth digital signals to compute a ratio of each absolute value of the signal components of frequencies the same as and twice the phase modulation frequency with respect to several sections divided in a range of $-\pi$ [rad] $\sim +\pi$ [rad] of the phase difference based on Sagnac effect to make zero and make the sum thereof constant, a sixth digital signal to control a data fetching from the analog/digital converter, and a seventh digital signal proportional to the angular velocity; a circuit for generating a clock signal; a first direct synthesizer for outputting a seventh analog signal in frequency synchronization with the clock signal, having an amplitude corresponding to the third digital signal and connected to the first synchronization detecting circuit, the seventh analog signal forming a drive signal for a phase modulation control, an eighth analog signal having a frequency twice the seventh analog signal and connected to the second synchronization detecting circuit, and a ninth analog signal having a frequency four times the seventh analog signal and connected to the third synchronization detecting circuit; a second direct synthesizer for outputting a tenth analog signal in frequency synchronization with the clock signal and having a frequency corresponding to the fourth digital signal; a third direct synthesizer for outputting an eleventh analog signal in frequency synchronization with the clock signal and having a frequency corresponding to the fifth digital signal; a high frequency oscillator for outputting a first high frequency analog signal; a first single side band generating circuit responsive to the first high frequency analog signal and the tenth analog signal, for outputting a second high frequency analog signal having a frequency of the sum of frequencies of the both signals and forming a drive signal for a frequency shift control; and a second single side band generating circuit responsive to the first high frequency analog signal and the eleventh analog signal, for outputting third high frequency analog signal having a frequency of the sum of frequencies of the both signals and forming another drive signal for the frequency shift control.

Furthermore, according to another aspect of the present invention, there is provided a method of driving a phase modulator used in an optical gyro, wherein the phase modulator is formed by closely winding a single mode polarization-preserving optical fiber on an outer circumferential surface of a cylindrical member consisting of piezoelectric material, the method including a step of: driving the phase modulator in a non-resonance region between a first resonant frequency in a radial direction of the cylindrical member and a second resonant frequency in a axial direction thereof and at an eigenfrequency determined by a delay time in which light is propagated through the single mode polarization-preserving optical fiber.

BRIEF DESCRIPTION OF THE DRAWINGS

Other objects and features of the present invention will be described hereinafter in detail by way of preferred embodiments with reference to the accompanying drawings, in which:

FIGS. 3a and 3b are diagrams representing the relation between the phase difference of light based on Sagnac effect and the normalized demodulated output;

FIGS. 4a to 4c are diagrams representing the relation between the phase difference and the computed value corresponding to the gyro output;

FIG. 5 is a circuit diagram illustrating a constitution of the SSB generating circuit shown in FIG. 2;

DESCRIPTION OF THE PREFERRED EMBODIMENTS

For a better understanding of the preferred embodiment of the present invention, the problem in the prior art will be explained with reference to FIG. 1.

Figure 1:
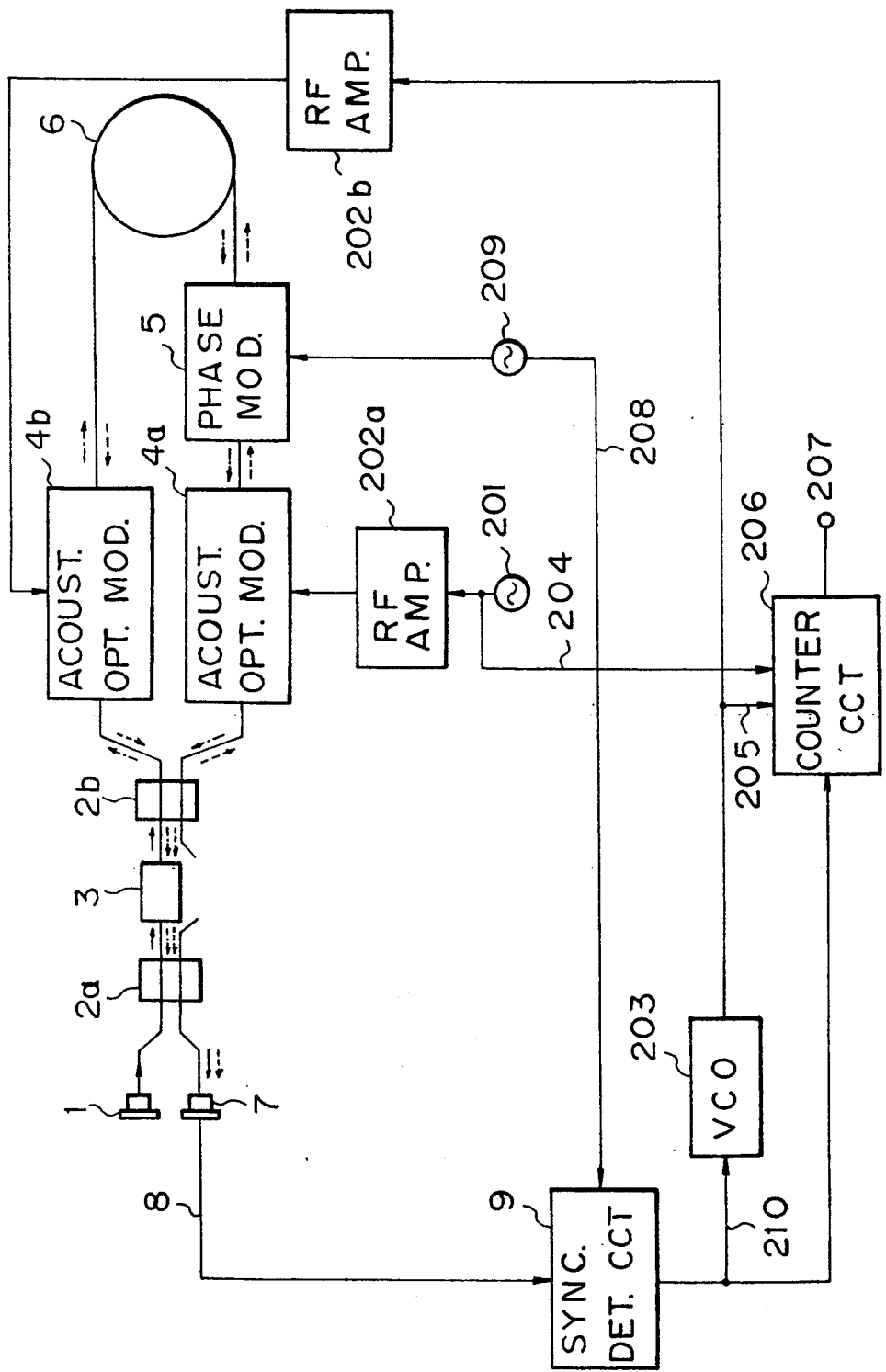
FIG. 1 is a circuit diagram illustrating a constitution of a prior art frequency shift optical fiber gyro.

FIG. 1 illustrates a constitution of a prior art frequency shift optical fiber gyro.

In the illustration, a first light beam emitted from a light source 1 is received at a first optical distributor and coupler 2a and then split into second and third light beams. The second light beam is propagated in the direction shown by an arrow mark of a solid line and received at a polarizer 3. A portion of the second light beam, i.e., only the polarized component, is transmitted through the polarizer 3 and received at a second optical distributor and coupler 2b. The second light beam incident on the second optical distributor and coupler 2b is split into fourth and fifth light beams.

The fourth light beam is propagated in the direction shown by an arrow mark of a broken line and received at a first acousto-optic modulator 4a driven by a first radio frequency (RF) amplifying circuit 202a. The fourth light beam incident on the first acousto-optic modulator 4a is given a frequency shift of $+f_{A1}$ by first-order Bragg diffracton. Note, $f_{A1}$ indicates a frequency of a drive signal 204 of the first acousto-optic modulator 4a. The frequency-shifted fourth light beam is received at a phase modulator 5 and then given a phase modulation of $\Phi$ m sin($\omega$ mt). Note, $\Phi$ m indicates a maximum phase shift and $\omega$ m indicates a drive angular frequency of the phase modulator. The phase-modulated fourth light beam is propagated counter-clockwise through an optical propagation path 6 formed by a single mode optical fiber wound perpendicularly with respect to the rotation axis and conserving the plane of polarization. After the propagation, the fourth light beam is received at a second acousto-optic modulator 4b driven by a second RF amplifying circuit 202b and given a frequency shift of $+f_{A2}$ by first-order Bragg diffracton. Note, $f_{A2}$ indicates a frequency of a drive signal 205 of the second acousto-optic modulator 4b. The frequency-shifted light beam is received at the second optical distributor and coupler 2b.

On the other hand, the fifth light beam is propagated in the direction shown by an arrow mark of a dot-and-dash line, received at the second acousto-optic modulator 4b, and given the frequency shift of $+f_{A2}$ by first-order Bragg diffracton. Then, the fifth light beam is propagated clockwise through the optical propagation path 6 and received at the phase modulator 5 to be given the phase modulation of $\Phi$ m sin($\omega$ mt). After the phase modulation, the fifth light beam is received at the first acousto-optic modulator 4a to be given the frequency shift of $+f_{A1}$ and received at the second optical distributor and coupler 2b.

The fourth and fifth light beams incident on the second optical distributor and coupler 2b are coupled to produce a sixth light beam. The sixth light beam is received at the polarizer 3 and a portion thereof, i.e., only the polarized component, is transmitted through the polarizer 3. The polarized sixth light beam is received at the first optical distributor and coupler 2a and split into seventh and eighth light beams. The eighth light beam is received at a photoelectric transducing circuit 7 to produce a transduced signal, i.e., photoelectric output signal 8. The photoelectric output signal 8 is expressed by the following formula;

$$V_1 \propto P_0[1 + J_0(h)\cos(K\omega - 2\pi nL(f_{A1} - f_{A2})/C) - \quad (1)$$

$$2J_1(h)\sin(K\omega - 2\pi nL(f_{A1} - f_{A2})/C) \cdot \cos(\omega mt) + \ldots][V]$$

Note, $V_1$ indicates the photoelectric output signal; $P_0$ a quantity of incoherent light of the eighth light beam; $J_i$ and i-order Bessel function (i=0,1,2, ... ); h a phase modulation index expressed by 2 $\Phi$m sin($\pi$ nL$\omega$ m/C); K a constant expressed by $4\pi$ RL/$\lambda$ C; R a radius of the optical propagation path; L a length of the optical fiber; $\lambda$ a wavelength of light in a vacuum atmosphere; C a speed of light in the vacuum atmosphere; $\omega$ an input angular velocity in the optical fiber gyro; and n an equivalent refractive index of the optical fiber.

The photoelectric output signal 8 is input to a synchronization detecting circuit 9 together with a phase modulator drive signal 208 output from an oscillator 209. The synchronization detecting circuit 9 detects a component of the same angular frequency as the drive angular frequency $\omega$ m for the phase modulator. Accordingly, an output signal 210 of the synchronization detecting circuit 9 is proportional to 2 $P_0J_1(h)\sin[K\omega - 2\pi nL(f_{A1}-f_{A2})/C]$. The synchronization detection output signal 210 is input to a VCO circuit 203.

The VCO circuit 203 changes a frequency $f_{A2}$ of its output signal, which is a drive signal 205 of the second acousto-optic modulator 4b, according to a difference level between a voltage of the synchronization detection output signal 210 and a reference voltage. The frequency $f_{A2}$ of the drive signal 205 is controlled so that the synchronization detection output signal 210 is brought to zero. Accordingly, the frequency $f_{A2}$ is expressed by the following formula;

$$f_{A2} = f_{A1} - (CK/2/\pi nL)\omega \qquad (2)$$
$$= f_{A1} - (2R/\lambda n)\omega [Hz]$$

A drive signal 204 output from an oscillator 201 and the drive signal 205 output from the VCO circuit 203 are mixed by a counter circuit 206 to take out the beat frequency. The counter circuit 206 counts up and down the beat frequency according to a polarity of the synchronization detection output signal 210 to produce a gyro output 207. The gyro output 207 is obtained as a digital output corresponding to the following formula;

$$(2 1 R/\lambda n)\omega [Hz] \qquad (3)$$

Even if the input angular velocity $\omega$ is zero, however, an equivalent error $\omega_E$ of the input angular velocity described below occurs so long as the frequencies $f_{A1}$, $f_{A2}$ of the drive signals 204,205 of the acousto-optic modulators 4a, 4b are not identical to each other. Namely, $$\omega_E = (\lambda n/2R)(f_{A1}-f_{A2})[rad/s] \qquad (4)$$

For example, when $\lambda = 0.83$ μm, n=1.45 and R=30 mm, $\omega_E$ takes 1°/hour where $(f_{A1}-f_{A2})=0.24$ Hz.

Since a drive frequency of an acousto-optic modulator is generally 80 MHz to 200 MHz, a frequency stability of each output signal of the oscillator 201 and VCO circuit 203 is demanded to be approximately $10^{-3}$ ppm where the fluctuation in the gyro output 207 is set below 1°/hour.

However, since a frequency stability of the ordinary VCO circuit 203 is approximately five or six ppm, it is difficult to increase a bias stability which is one of characteristics of the gyro. Also, since the drive signals 204,205 of the acousto-optic modulators 4a, 4b are generated from two separate circuits, i.e., the oscillator 201 and VCO circuit 203, respectively, the value of $(f_{A1}-f_{A2})$ easily fluctuates and thus a possibility occurs in that the bias stability is lowered.

On the other hand, a linearity and stability of the VCO circuit 203 with respect to the synchronization detection output signal 210 determine a linearity and scale factor stability of the gyro output. The linearity and stability of the VCO circuit 203, however, is easily changed depending upon a change in circumstances.

Also, in the prior art optical fiber gyro, the output signal 210 of the synchronization detecting circuit 9 is proportional not only to 2 $P_0J_1(h)\sin[K\omega - 2\pi nL(f_{A1}-f_{A2})/C]$, but also to $\cos\theta$, where $\theta$ indicates a phase difference between the drive signal 208 of the phase modulator 5 and a signal component contained in the photoelectric output signal 8 and having the same frequency as the drive signal 208. Therefore, a possibility occurs in that the linearity and scale factor stability of the gyro output are deteriorated due to a fluctuation in the quantity $P_0$ of incoherent light of the eighth light beam, a fluctuation in the maximum phase shift $\Phi m$ of the phase modulator 5 and a fluctuation in the phase difference $\theta$.

Also, since $f_{A1}=f_{A2}$ the moment the optical fiber gyro is brought to an operating state, the output signal 210 of the synchronization detecting circuit 9 is proportional to sin $K\omega$. Therefore, when a navigation object loaded with the optical fiber gyro is in movement, a detectable maximum angular velocity $\omega m$ is limited to $\pm \pi/2K$ the moment the optical fiber gyro is brought to the operating state.

Next, a preferred embodiment of the present invention will be explained with reference to FIG. 2, which illustrates a constitution of the frequency shift optical fiber gyro.

The illustrated optical fiber gyro includes, in addition to the light source 1, optical distributor and couplers 2a,2b, polarizer 3, acousto-optic modulators 4a,4b, phase modulator 5, optical propagation path 6 and photoelectric transducing circuit 7 shown in FIG. 1, first, second and third synchronization detecting circuits 9a,9b and 9c, an isolation amplifier 16, an analog/digital (A/D) converter 17, a computation/control circuit 19, a master clock circuit 21, first, second and third direct synthesizers 22a,22b and 22c, a buffer amplifier 26, a high frequency oscillator 28, and first and second single side band (SSB) signal generating circuits 30a and 30b.

Figure 2:
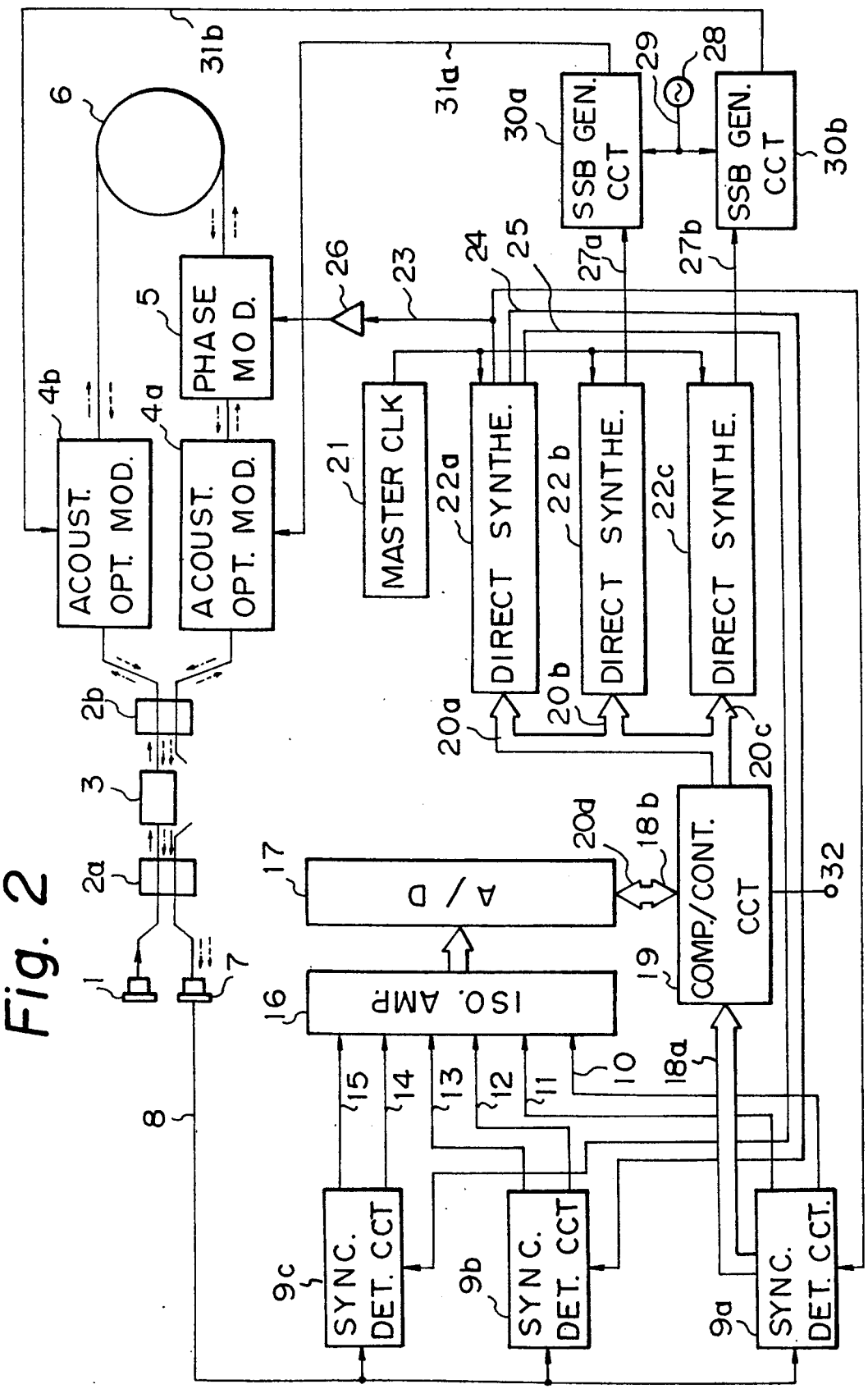
FIG. 2 is a circuit diagram illustrating a constitution of the frequency shift optical fiber gyro as an embodiment of the present invention.

In the illustration of FIG. 2, the same references as those used in FIG. 1 indicate like constituent elements and thus the explanation thereof is omitted. Also, the process in which a light beam is propagated from the light source 1 via each element 2a,2b,3,4a,4b,5 and 6 to the photoelectric transducing circuit 7 is the same as that in FIG. 1 and thus the explanation thereof is omitted.

In the present embodiment, the output signal 8 of the photoelectric transducing circuit 7 is input to the first, second and third synchronization detecting circuits 9a,9b and 9c.

The first synchronization detecting circuit 9a takes a signal component of the same frequency as the drive angular frequency $\omega m$ of the phase modulator 5 out of the photoelectric output signal 8 and outputs first and second analog signals 10 and 11. The first and second analog signals 10 and 11 are expressed by the following formula;

<signal 10>;
$V_{m,1} \propto 2P_0J_1(h) \times \sin[K\omega - 2\pi nL(f_{A1}-f_{A2})/C] \cdot \cos\theta m$ (2a)

<signal 11>;
$V_{m,2} \propto 2P_0J_1(h) \times \sin[K\omega - 2\pi nL(f_{A1}-f_{A2})/C] \cdot \sin\theta m$ (2b)

Note, $\theta m$ indicates a phase difference between the signal component of the angular frequency $\omega m$ taken out of the photoelectric output signal 8 and a seventh analog signal 23 having the angular frequency $\omega m$.

The second synchronization detecting circuit 9b takes a signal component of the angular frequency 2 $\omega m$ out of the photoelectric output signal 8 and outputs third and fourth analog signals 12 and 13. The third and fourth analog signals 12 and 13 are expressed by the following formula;

<signal 12>;
$$V_{2m,1} \propto 2P_0J_2(h) \times \cos[K\omega - 2\pi nL(f_{A1}-f_{A2})/C] \cdot \cos\theta_{2m} \quad (3a)$$

<signal 13>;
$$V_{2m,2} \propto 2P_0J_2(h) \times \cos[K\omega - 2\pi nL(f_{A1}-f_{A2})/C] \cdot \sin\theta_{2m} \quad (3b)$$

Note, $\theta_{2m}$ indicates a phase difference between the signal component of the angular frequency $2\omega m$ taken out of the photoelectric output signal 8 and an eighth analog signal 24 having the angular frequency $2\omega m$.

The third synchronization detecting circuit 9c takes a signal component of the angular frequency $4\omega m$ out of the photoelectric output signal 8 and outputs fifth and sixth analog signals 14 and 15. The fifth and sixth analog signals 14 and 15 are expressed by the following formula;

<signal 14>;
$$V_{4m,1} \propto 2P_0J_4(h) \times \cos[K\omega - 2\pi nL(f_{A1}-f_{A2})/C] \cdot \cos\theta_{4m} \quad (4a)$$

<signal 15>;
$$V_{4m,2} \propto 2P_0J_4(h) \times \cos[K\omega - 2\pi nL(f_{A1}-f_{A2})/C] \cdot \sin\theta_{4m} \quad (4b)$$

Note, $\theta_{4m}$ indicates a phase difference between the signal component of the angular frequency $4\omega m$ taken out of the photoelectric output signal 8 and a ninth analog signal 25 having the angular frequency $4\omega m$.

The above first to sixth analog signals 10 to 15 are electrically isolated by the isolation amplifier 16 from the synchronization detecting circuits 9a to 9c and input to the A/D converter 17 with keeping each output expressed by the formulas (2a)~(4b) as it is. The A/D converter 17 converts the analog signal to a second digital signal 18b. The second digital signal 18b is expressed, for example, by binary number.

The second digital signal 18b is fetched into the computation/control circuit 19 in response to a sixth digital signal 20d by which the computation/control circuit 19 controls the A/D converter 17. On the other hand, the first synchronization detecting circuit 9a has a function of automatically changing sensitivity for synchronization detection. Information on the sensitivity is output as a first digital signal 18a and fetched into the computation/control circuit 19. Upon receipt of the first and second digital signals 18a and 18b, the computation/control circuit 19 executes logic discrimination described below.

Figure 3A:
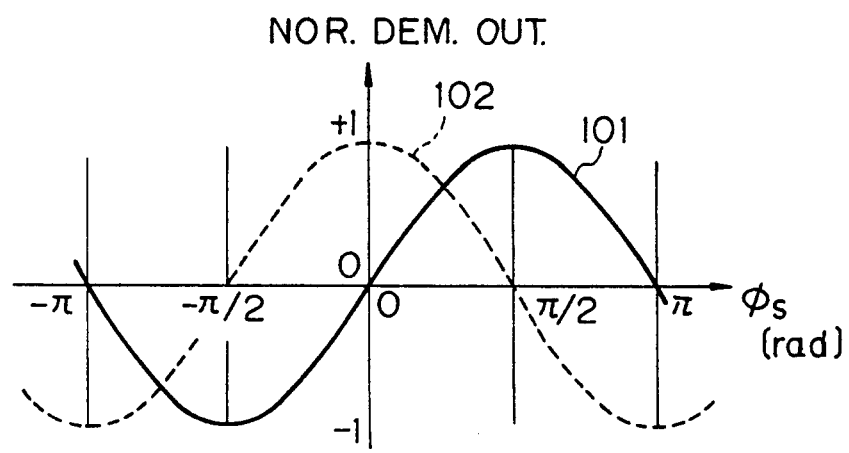

Note, the first and third analog signals 10 and 12 correspond to normalized synchronization detection outputs (normalized demodulated outputs) 101 and 102 shown in FIG. 3a, respectively.

Referring to FIG. 3a, each of the normalized demodulated outputs 101, 102 takes a sign or polarity as shown in FIG. 3b with respect to several sections divided in the range of $-\pi[\text{rad}] \sim +\pi[\text{rad}]$ of the phase difference $\phi s$ of light based on Sagnac effect. Therefore, it is possible to determine the section to which the phase difference $\phi s$ belongs by carrying out the logic discrimination based on FIG. 3b. Note, $\phi s$ equals to $[K\omega - 2\pi nL(f_{A1}-f_{A2})/C]$.

Next, the computation/control circuit 19 executes the following computation based on the first and second digital signals 18a and 18b.

$$|J_2(h)/J_1(h)| \times \quad (5a)$$

$$(V_{m,1}^2 + V_{m,2}^2)^{\frac{1}{2}}/(V_{2m,1}^2 + V_{2m,2}^2)^{\frac{1}{2}} = |\tan[K\omega - 2\pi nL(f_{A1}-f_{A2})/C]|$$

$$|J_1(h)/J_2(h)| \times \quad (5b)$$

$$(V_{2m,1}^2 + V_{2m,2}^2)^{\frac{1}{2}}/(V_{m,1}^2 + V_{m,2}^2)^{\frac{1}{2}} = |\cot[K\omega - 2\pi nL(f_{A1}-f_{A2})/C]|$$

Figure 4A:
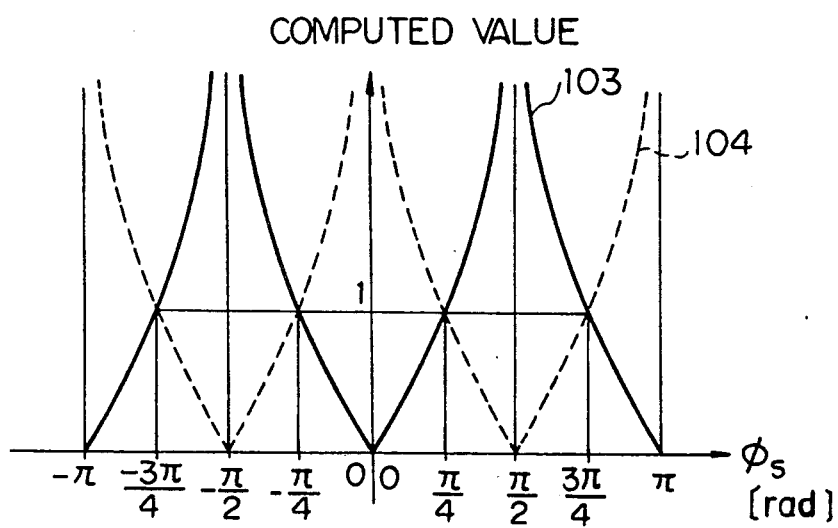

The computed values expressed by the formulas (5a) and (5b) correspond to references 103 and 104 shown in FIG. 4a, respectively. The computation/control circuit 19 carries out the computation as shown in FIG. 4b with respect to the phase difference $\phi s$ based on the section or range of the phase difference $\phi s$ determined by the logic discrimination of FIG. 3b and the computed values 103 and 104 shown in FIG. 4a.

The computation/control circuit 19 inverts a sign of each computed value shown in FIG. 4b and multiplies the inverted value by a proportional factor $\alpha$ to obtain an integer value M. At this time, the circuit 19 outputs a value of (N+M) as a fourth digital signal 20b and a value of (N−M) as a fifth digital signal 20c. Note, N indicates a bias value which is a positive integer. (N+M) and (N−M) are also positive integers.

The second and third direct synthesizers 22b, 22c respond to a clock signal output from the master clock circuit 21 and the fourth and fifth digital signals 20b, 20c and output tenth and eleventh analog signals 27a, 27b having frequencies of (N+M) $f_L$, (N−M) $f_L$, respectively. Note, $f_L$ indicates a basic frequency in frequency synchronization with the clock signal output from the master clock circuit 21.

The high frequency oscillator 28 outputs a first high frequency analog signal 29. The high frequency analog signal 29 together with the tenth and eleventh analog signals 27a, 27b is input to the first and second SSB generating circuits 30a, 30b, respectively. The first SSB generating circuit 30a outputs a second high frequency analog signal 31a having a frequency of the sum of each frequency of the first high frequency analog signal 29 and tenth analog signal 27a, i.e., $[f_H+(N+M) f_L]$. Note, $f_H$ indicates a frequency of the first high frequency analog signal 29. On the other hand, the second SSB generating circuit 30b outputs a third high frequency analog signal 31b having a frequency of the sum of each frequency of the first high frequency analog signal 29 and eleventh analog signal 27b, i.e., $[f_H+(N-M) f_L]$.

The second and third high frequency analog signals 31a, 31b form the drive signals for the first and second acousto-optic modulators 4a, 4b, respectively.

The computation/control circuit 19 functions so that the computed value indicated by formula (5a) comes to zero, i.e., so that the first and second analog signals 10, 11 output from the first synchronization detecting circuit 9a are brought to zero. Accordingly, the following formula;

$$f_{A1}-f_{A2}=2R\omega/\lambda n \quad (6)$$

is introduced. Also, from the following two formulas;

$$f_{A1}=f_H+(N+M)f_L \quad (7a)$$

$$f_{A2}=f_H+(N-M)f_L \quad (7b)$$

the following formula;

$$f_{A1} - f_{A2} = 2Mf_L \quad (8)$$

is introduced. Thus, from formulas (6) and (8), the following formula;

$$M = R\omega/\lambda n f_L \quad (9)$$

is introduced. The above M is obtained from a seventh digital signal 32 (gyro output) output from the computation/control circuit 19.

As explained above, the drive signals (second and third high frequency analog signals 31a,31b) for the first and second acousto-optic modulators 4a,4b commonly include the frequency $f_H$ of the first high frequency analog signal 29 and the basic frequency $f_L$ which the direct synthesizers 22b,22c generate in frequency synchronization with the clock signal from the master clock circuit 21. As a result, when the input angular velocity ω is zero, $f_{A1}$ equals to $f_{A2}$. Accordingly, an advantage is obtained in that each frequency stability in the first to third high frequency analog signals 29, 31a and 31b does not affect the bias stability of the optical fiber gyro.

Also, the second and third direct synthesizers 22b and 22c maintain the frequency $f_L$ of 0.1 mHz over a wide range of frequency of (N±M) $f_L$ (=0.1 mHz to 1.2 MHz) and keep the frequency stability in the clock signal from the master clock circuit 21 as it is. Therefore, it is possible to minimize a bias fluctuation in the gyro occurring due to an unstability in frequency of the drive signal for the acousto-optic modulator as seen in the prior art frequency shift optical fiber gyro.

Furthermore, the frequency shift M $f_L$ of the drive signals 31a,31b for the acousto-optic modulators 4a,4b is related linearly to the tenth and eleventh analog signals 27a,27b output from the second and third direct synthesizers 22b,22c. As a result, the linearity and scale factor stability of the gyro only depend on zero point stabilities of the isolation amplifier 16 and A/D converter 17 and the frequency stability in the output clock signal of the master clock circuit 21. Accordingly, it is possible to obtain an electrical signal proportional to the input angular velocity with much higher accuracy than the prior art.

Also, the computation/control circuit 19 executes the computation shown by the formulas (5a),(5b) based on the outputs 10 to 13 of the first and second synchronization detecting circuits 9a,9b shown by the formulas (2a),(2b),(3a) and (3b) and causes the second and third direct synthesizers 22b,22c to shift the respective output frequency. Therefore, it is possible to perfectly remove a possibility in that the linearity and scale factor stability of the gyro are deteriorated due to a fluctuation in the quantity $P_0$ of incoherent light of the light beam incident on the photoelectric transducing circuit 7 or a fluctuation in the phase differences $\theta_1 m, \theta_2 m$ explained with respect to the formulas (2a),(2b),(3a) and (3b).

Moreover, when a navigation object loaded with the optical fiber gyro of the present embodiment is in movement, it is possible to expand the detectable maximum angular velocity ωm to ±π/K by carrying out the logic discrimination and computation shown in FIGS. 3b and 4b the moment the gyro is brought to its operating state.

On the other hand, the computation/control circuit 19 executes the following computation based on the first and second digital signals 18a and 18b.

$$(V_{2m,1}^2 + V_{2m,2}^2)^{\frac{1}{2}}/(V_{4m,1}^2 + V_{4m,2}^2)^{\frac{1}{2}} = |J_2(h)/J_4(-h)| \quad (10)$$

The computation/control circuit 19 outputs a third digital signal 20a so that the computed value shown by the formula (10) is kept constant. The first direct synthesizer 22a outputs the seventh analog signal 23 having an output amplitude corresponding to the third digital signal 20a in frequency synchronization with the output clock signal of the master clock circuit 21. The seventh analog signal 23 is input to the buffer amplifier 26 to form the drive signal for the phase modulator 5. At this time, the modulation index h of the phase modulator 5 is kept constant by forcibly changing the maximum phase shift Φm of the phase modulator 5 by the amplitude of the seventh analog signal 23. Accordingly, it is possible to prevent a deterioration in the linearity and scale factor stability of the gyro due to a fluctuation in the modulation index h.

Additionally, FIG. 4c shows another example of values computed by the computation/control circuit 19 with respect to the phase difference of light based on Sagnac effect, corresponding to FIG. 4b.

FIG. 5 illustrates a concrete constitution of the SSB generating circuit 30a (30b).

In the illustration, a 0° divider 39 receives the first high frequency analog signal 29 and divides the signal into two in-phase signals having an equal power. A first 90° hybrid circuit 38a receives a fourth high frequency analog signal 37 and divides the signal into two signals having an equal power. One of the divided signals is in-phase with the input signal 37 (0° phase output signal), and another thereof is shifted in phase by 90° from the input signal 37 (90° phase output signal). One of the output signals of the 0° divider 39 and the 0° phase output signal of the first 90° hybrid circuit 38a are mixed in frequency by a first double balanced mixer (DBM) 33b. In a like manner, another of the output signals of the 0° divider 39 and the 90° phase output signal of the first 90° hybrid circuit 38a are mixed in frequency by a second DBM 33c. Output signals of the first and second DBMs 33b,33c are input to a 0° port and a 90° port of a second hybrid circuit 38b, respectively, to form a twelfth analog signal 40 having a difference between each frequency of the high frequency analog signals 29 and 37.

The twelfth analog signal 40 together with the tenth (eleventh) analog signal 27a(27b) is input to a third DBM 33a and mixed in frequency. An output signal 34 of the DBM 33a is input to a voltage comparing circuit 35 and compared with a reference voltage. An output signal of the voltage comparing circuit 35 is input to a VCO circuit 36 to form the fourth high frequency analog signal 37. The high frequency analog signal 37 has a frequency proportional to the output signal of the voltage comparing circuit 35 and has a frequency of the sum of each frequency of the analog signals 29 and 27a(27b). The fourth high frequency analog signal 37 is amplified in power by a radio frequency (RF) amplifying circuit 41 to form the second (third) high frequency analog signal 31a(31b), which is the drive signal for the first (second) acousto-optic modulator 4a(4b).

By the above constitution, it becomes possible to obtain the output of the sum of the high frequency analog signal (29) of approximately 100 MHz and the analog signal (27a,27b) of approximately five or six MHz.

As explained above, according to the embodiment of FIG. 2, the photoelectric output signal 8 indicating the phase difference of light based on Sagnac effect is treated by digital circuits of the computation/control circuit 19, direct synthesizers 22a to 22c and the like, and the drive signals 31a,31b for the pair of acousto-optic modulators 4a,4b are generated based on the analog signal 29 output from an identical high frequency oscillator 28 and shifted by the predetermined frequency. Therefore, it is possible to perfectly remove the influences due to a fluctuation in the quantity of incoherent light, a fluctuation in the phase modulation index and a fluctuation in the phase difference between the photoelectric output signal 8 and the phase modulator (5) drive signal. This contributes to an improvement in the gyro characteristics, i.e., bias stability, linearity and scale factor stability.

Also, since the logic discrimination and computation (see FIGS. 3b,4b and 4c) are executed by the computation/control circuit 19, it is possible to expand the maximum range of detection of the input angular velocity $\omega m$ to $\pm \pi/K$.

Next, another embodiment of the present invention will be explained with reference to FIGS. 6 and 7.

In a like manner as the first embodiment, the problem in the prior art will be first explained with reference to FIG. 6, which illustrates a constitution of a phase modulation optical fiber gyro.

Figure 6:
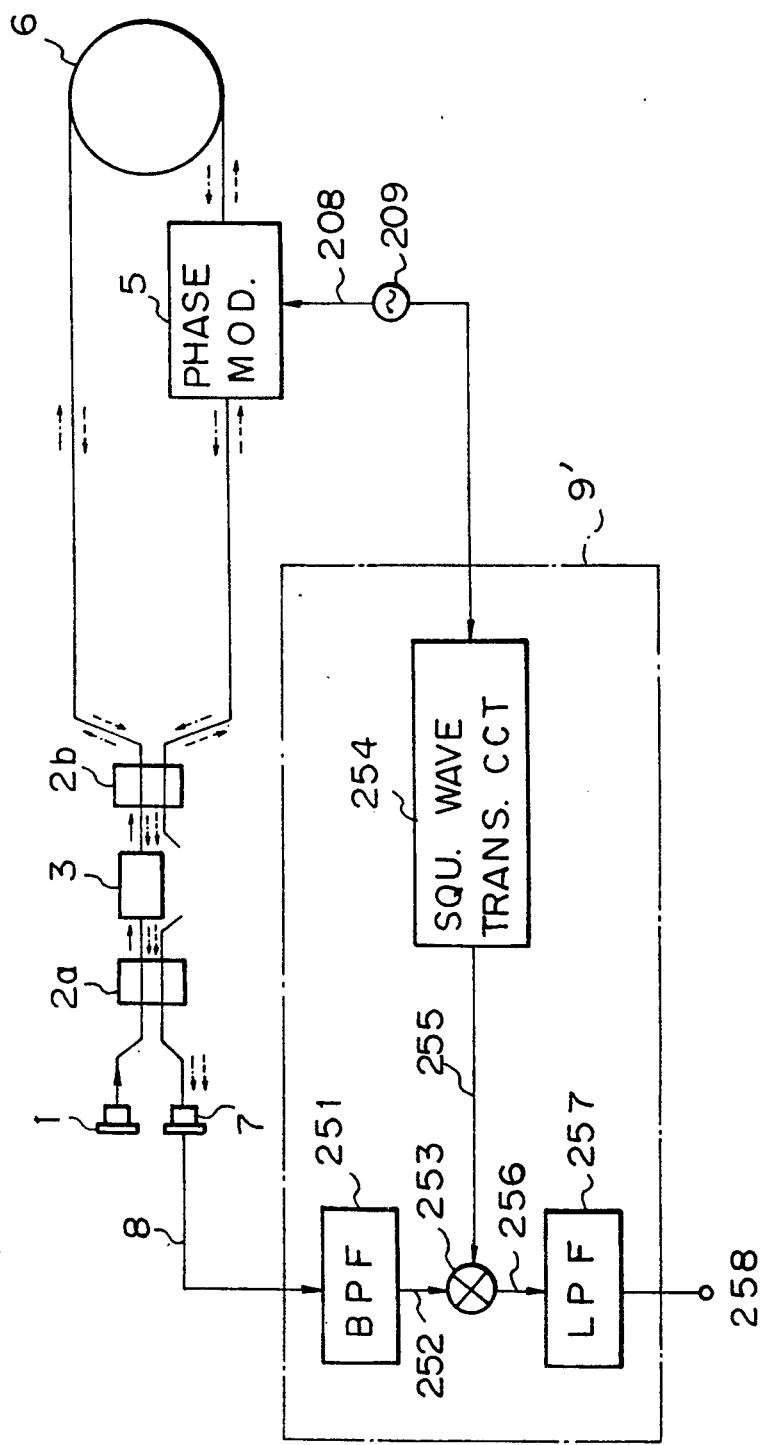
FIG. 6 is a circuit diagram illustrating a constitution of a prior art phase modulation optical fiber gyro.
Figure 7:
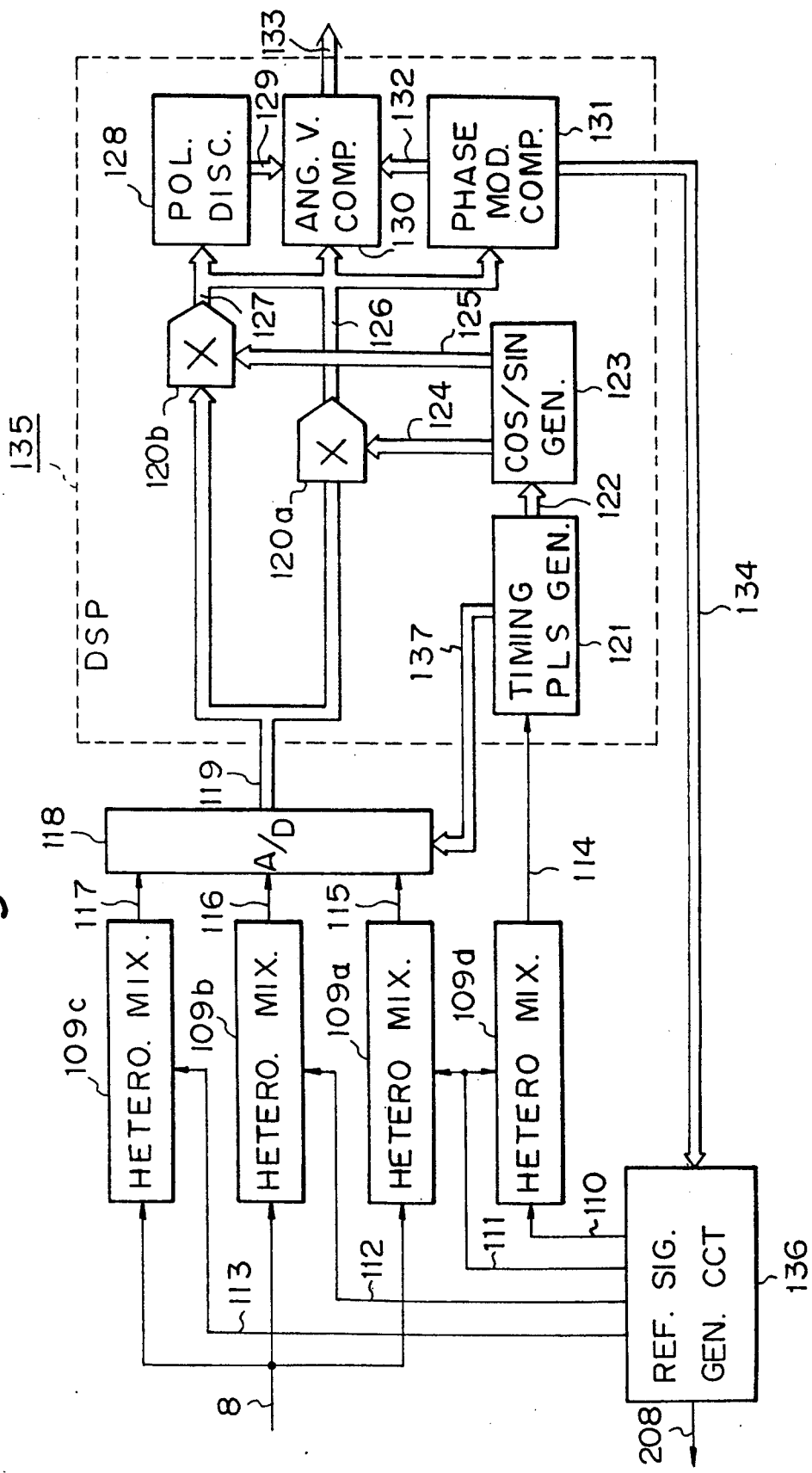
FIG. 7 is a circuit diagram illustrating a constitution of the signal processing apparatus as an embodiment of the present invention, applied to a phase modulation optical fiber gyro.

In the illustration of FIG. 6, the same references as those used in FIG. 1 indicate like constituent elements and thus the explanation thereof is omitted. Note, reference 9' denotes a synchronization detecting circuit. In the constitution of FIG. 6, the photoelectric output signal 8 output from the photoelectric transducing circuit 7 is expressed by the following formula;

$$V_1 \propto P_0(1 + J_0(h)\cos\phi s + \qquad (11)$$

$$2\cos\phi s \sum_{k=1}^{\infty} (-1)^k J_{2k}(h)\cos[2k\omega_m(t - \tau/2)] +$$

$$2\sin\phi s \sum_{k=1}^{\infty} (-1)^k J_{2k-1}(h)\cos[(2k - 1)\omega_m(t - \tau/2)])$$

The formula (11) corresponds to the formula (1). Note, $\tau$ indicates a delay time in the optical propagation path and equals to $nL/C$; and $\phi s$ indicates a phase difference of light based on Sagnac effect and equals to $4\pi RL\omega/\lambda C$.

In the present embodiment, the photoelectric output signal 8 is input to a band pass filter (BPF) 251 and a portion thereof, i.e., a component of the same angular frequency $\omega m$ as the phase modulator drive signal 208 is transmitted through the filter 251. On the other hand, the drive signal 208 output from the oscillator 209 is input to a square wave transducing circuit 254 and transduced into a square wave of the same frequency as and in phase synchronization with the drive signal 208.

An output signal 252 of the band pass filter 251 is input to an analog multiplier 253 together with an output signal 255 of the square wave transducing circuit 254. An output signal 256 of the analog multiplier 253 is expressed by the following formula;

$$V_2 \propto -2P_0\sin\phi s J_1(h)\cos[\omega_m(t - \tau/2)] \times \qquad (12)$$

$$[(2/\pi) \sum_{k=1}^{\infty} \sin[(2k-1)\omega_m t + \phi\omega_{m0}]/(2k - 1) + 1/2] + U_2' =$$

-continued $$-(2/\pi)P_0\sin\phi s J_1(h) \times \sum_{k=1}^{\infty} [\sin(2k\omega_m t + \phi\omega_{m0} - \omega_m\tau/2) +$$

$$\sin(2(k - 1)\omega_m t + \phi\omega_{m0} + \omega_m\tau/2)](2k - 1) -$$

$$P_0\sin\phi s J_1(h)\cos[\omega_m(t - \tau/2)] + U_2$$

Note, $V_2$ denotes the output signal 256 of the analog multiplier; $\psi\omega_m 0$ an initial phase of the output signal 255 of the square wave transducing circuit; and $U_2$ an offset voltage of the analog multiplier.

The output signal 256 of the analog multiplier 253 is input to a low pass filter (LPF) 257 and only a direct current (DC) component thereof is transmitted through the filter 257 to form an output signal 258 of the gyro. The gyro output signal 258 is expressed by the following formula;

$$V_3 \propto -(2/\pi)P_0 \sin \phi s\, J_1\,(h)\sin \psi\omega_m + U_2 + U_3 \qquad (13)$$

Note, $V_3$ denotes the gyro output signal 258; $\psi\omega_m$ a phase different ($\psi\omega_m 0 + \omega_m\tau/2$) between the output signal 252 of the band pass filter and the output signal 255 of the square wave transducing circuit; and $U_3$ an offset voltage of the low pass filter.

In the prior art phase modulation optical fiber gyro, the signal processing circuit (corresponding to the synchronization detecting circuit 9' of FIG. 6) has a number of drawbacks. Namely, since the gyro output signal 258 is proportional to $\sin \phi s$ even if the offset voltages $U_2,U_3$ are zero, a linearity of the gyro output to the input angular velocity $\omega$ is not good. Also, a detectable input angular velocity is limited to the range corresponding to $\pm \pi/2$ [rad] for the phase difference $\phi s$ based on Sagnac effect.

Also, a possibility occurs in that the linearity and scale factor stability of the gyro output are deteriorated due to a fluctuation in the quantity $P_0$ of incoherent light of the light beam incident on the photoelectric transducing circuit 7, a fluctuation in the maximum phase shift $\Phi m$ of the phase modulator 5 and a fluctuation in the phase difference $\psi\omega_m$.

Furthermore, a possibility also occurs in that, even if the input angular velocity is zero, i.e., the phase difference based on Sagnac effect is zero, the bias stability of the gyro is lowered due to fluctuations in the offset voltages $U_2,U_3$.

Next, an embodiment of the present invention will be explained with reference to FIG. 7, which illustrates a constitution of the signal processing apparatus applied to a phase modulation optical fiber gyro.

The illustration includes first to fourth heterodyne mixers 109a,109b,109c and 109d, an A/D converter 118, a digital signal processor (DSP) 135, and a reference signal generating circuit 136. The digital signal processor 135 includes first and second digital multiplication units 120a and 120b, a timing pulse generation unit 121, a cosine/sine (signal) generation unit 123, a polarity discrimination unit 128, an angular velocity computation unit 130 and a phase modulation index computation unit 131, and executes various operations based on software processing.

The photoelectric output signal 8 and phase modulator drive signal 208 are the same as those in FIG. 6. Accordingly, the signal processing apparatus of the present embodiment can be substituted for the synchronization detecting circuit 9' of FIG. 6.

In the present embodiment, the phase-modulated photoelectric output signal 8 is input to the first, second and third heterodyne mixers 109a, 109b and 109c.

The first heterodyne mixer 109a takes a signal component of the same frequency as the drive frequency fm of the phase modulator 5 out of the photoelectric output signal 8 and converts the signal component to a signal of a frequency $\Delta$ fm. The converted signal is output as a first analog signal 115, which is expressed by the following formula;

$$<\text{signal 115}>; V_{\omega_m}, \Delta\omega_m \propto 2P_0 J_1(h) \times \sin\phi_s \sin(\Delta\omega_m t + \psi_{\omega_m}) \quad (14)$$

Note, $\Delta\omega_m$ is equal to $2\pi\Delta$ fm and $\psi_{\omega_m}$ indicates a phase difference between the signal component of the frequency fm taken out of the photoelectric output signal 8 and a twelfth digital signal 111 having a frequency of (fm + $\Delta$ fm).

The second heterodyne mixer 109b takes a signal component of a frequency 2 fm out of the photoelectric output signal 8 and converts the signal component to a signal of the frequency $\Delta$ fm. The converted signal is output as a second analog signal 116, which is expressed by the following formula;

$$<\text{signal 116}>; V_{2\omega_m,\Delta\omega_m} \propto 2P_0 J_2(h) \times \cos\phi_s \sin(\Delta\omega_m t + \psi_{2\omega_m}) \quad (15)$$

Note, $\psi_{2\omega_m}$ indicates a phase difference between the signal component of the frequency 2 fm taken out of the photoelectric output signal 8 and a thirteenth digital signal 112 having a frequency of (2 fm + $\Delta$ fm).

The third heterodyne mixer 109c takes a signal component of a frequency 4 fm out of the photoelectric output signal 8 and converts the signal component to a signal of the frequency $\Delta$ fm. The converted signal is output as a third analog signal 117, which is expressed by the following formula;

$$<\text{signal 117}>; V_{4\omega_m,\Delta\omega_m} \propto 2P_0 J_4(h) \times \cos\phi_s \sin(\Delta\omega_m t + \psi_{4\omega_m}) \quad (16)$$

Note, $\psi_{4\omega_m}$ indicates a phase difference between the signal component of the frequency 4 fm taken out of the photoelectric output signal 8 and a fourteenth digital signal 113 having a frequency of (4 fm + $\Delta$ fm).

The above first to third analog signals 115 to 117 are input to the A/D converter 118 to be converted to a first digital signal 119. The first digital signal 119 is expressed, for example, by binary number.

The fourth heterodyne mixer 109d converts a fifth analog signal 110, which is fed by the reference signal generating circuit 136 and has the same frequency fm as the drive signal 208 and synchronizes in phase therewith, to a signal of the frequency $\Delta$ fm. The converted signal is output as a fourth analog signal 114, which is expressed by the following formula;

$$<\text{signal 114}>; V_{REF,\Delta\omega_m} \propto \sin(\Delta\omega_m t + \psi_{REF}) \quad (17)$$

Note, $\psi_{REF}$ denotes a phase difference between the fifth analog signal 110 and the twelfth digital signal 111.

The fourth analog signal 114 is input to the timing pulse generation unit 121 and converted to second and third digital signals 37, 22 in phase synchronization with the analog signal 114. The second digital signal 37 is input to the A/D converter 118. The A/D converter 118 converts the first to third analog signals 115 to 117 to the first digital signal 119 in synchronization with the second digital signal 37. On the other hand, the third digital signal 22 is input to the cosine/sine generation unit 123. In phase synchronization with the third digital signal 22, the cosine/sine generation unit 123 divides one cycle of the digital signal 22 into time slots at every predetermined time and outputs values of cosine and sine, which are generated at timings corresponding to the time slots and shifted in phase by 90° from each other. The values of cosine and sine are output as fourth and fifth digital signals 124 and 125, respectively, which are expressed by the following formulas;

$$<\text{signal 124}>; V_{REF, cos} \propto \cos(\Delta\omega_m t + \psi_{REF}) \quad (18)$$

$$<\text{signal 125}>; V_{REF, sin} \propto \sin(\Delta\omega_m t + \psi_{REF}) \quad (19)$$

The fourth digital signal 124 together with the first digital signal 119 is input to the first digital multiplication unit 120a, where the multiplication of both signals is digitally carried out. The unit 120a takes out a DC component by means of a digital filter (not shown) to output a sixth digital signal 126. Signals corresponding to the first to third analog signals 115 to 117 of the sixth digital signal 126 are expressed by the following formulas;

$$<\text{signal 126 corresponding to signal 115}>; V_{\omega_m, cos} \propto P_0 J_1(h) \sin\phi_s \sin\psi_{\omega_m}' \quad (20)$$

$$<\text{signal 126 corresponding to signal 116}>; V_{2\omega_m, cos} \propto P_0 J_2(h) \cos\phi_s \sin\psi_{2\omega_m}' \quad (21)$$

$$<\text{signal 126 corresponding to signal 117}>; V_{4\omega_m, cos} \propto P_0 J_4(h) \cos\phi_s \sin\psi_{4\omega_m}' \quad (22)$$

where $$\psi_{\omega_m}' = \psi_{\omega_m} - \psi$$

$$\psi_{2\omega_m}' = \psi_{2\omega_m} - \psi$$

$$\psi_{4\omega_m}' = \psi_{4\omega_m} - \psi$$

In a like manner, the fifth digital signal 125 together with the first digital signal 119 is input to the second digital multiplication unit 120b, where the multiplication of both signals is digitally carried out. The unit 120b takes out a DC component by means of a digital filter (not shown) to output a seventh digital signal 127. Signals corresponding to the first to third analog signals 115 to 117 of the seventh digital signal 127 are expressed by the following formulas;

$$<\text{signal 127 corresponding to signal 115}>; V_{\omega_m, sin} \propto P_0 J_1(h) \sin\phi_s \cos\psi_{\omega_m}' \quad (23)$$

$$<\text{signal 127 corresponding to signal 116}>; V_{2\omega_m, sin} \propto P_0 J_2(h) \cos\phi_s \cos\psi_{2\omega_m}' \quad (24)$$

$$<\text{signal 127 corresponding to signal 117}>; V_{4\omega_m, sin} \propto P_0 J_4(h) \cos\phi_s \cos\psi_{4\omega_m}' \quad (25)$$

The sixth and seventh digital signals 126, 127 expressed by the formulas (20) to (25) are input to the polarity discrimination unit 128. The polarity discrimination unit 128 executes the following logic discrimination based on the relation between the components $V_{\omega_m, cos}$ and $V_{2\omega_m, cos}$ or $V_{4\omega_m, cos}$ of the sixth digital signal 126, and the relation between the components $V_{\omega m, sin}$ and $V_{2\omega m, sin}$ or $V_{4\omega m, sin}$ of the seventh digital signal 127.

Note, the components $V_{\omega m, cos}$ and $V_{\omega m, sin}$ correspond to the normalized demodulated output 101 shown in FIG. 3a and the components $V_{2\omega m, cos}$, $V_{4\omega m, cos}$, $V_{2\omega m, sin}$ and $V_{4\omega m, sin}$ correspond to the normalized demodulated output 102.

Referring to FIG. 3a, each of the normalized demodulated outputs 101,102 takes a sign or polarity as shown in FIG. 3b with respect to each range of the phase difference $\phi$ s based on Sagnac effect. Therefore, it is possible to determine the range to which the phase difference $\phi$ s belongs and the polarity of the input angular velocity by carrying out the logic discrimination based on FIG. 3b. The polarity discrimination unit 128 outputs an eighth digital signal 129 corresponding to the range of the phase difference $\phi$ s.

On the other hand, the phase modulation index computation unit 131 executes the following computation based on the components $V_{2\omega m, cos}$ and $V_{4\omega m, cos}$ of the sixth digital signal 126 and the components $V_{2\omega m, sin}$ and $V_{4\omega m, sin}$ of the seventh digital signal 127.

$$(V_{2\omega m, cos}^2 + V_{2\omega m, sin}^2)^{\frac{1}{2}}/(V_{4\omega m, cos}^2 + V_{4\omega m, sin}^2)^{\frac{1}{2}} = |J_2(h)/J_4(h)| \quad (26)$$

The formula (26) corresponds to the formula (10).

The phase modulation index computation unit 131 outputs a ninth digital signal 134 so that the computed value shown by the formula (26) is kept constant. Also, the unit 131 executes the following computation based on the computed value of the formula (26).

$$g[|J_2(h)/J_4(h)|] = |J_2(h)/J_1(h)| \quad (27)$$

Note, g[ ] indicates a function for converting $|J_2(h)/J_4(h)|$ to $|J_2(h)/J_1(h)|$.

The phase modulation index computation unit 131 outputs a tenth digital signal 132 corresponding to the computed value shown by the formula (27).

Next, the angular velocity computation unit 130 executes the following computation based on the tenth digital signal 132, the components $V_{\omega m, cos}$ and $V_{2\omega m, cos}$ of the sixth digital signal 126 and the components $V_{\omega m, sin}$ and $V_{2\omega m, sin}$ of the seventh digital signal 127.

$$|J_2(h)/J_1(h)| \times \quad (28a)$$
$$(V_{\omega m, cos}^2 + V_{\omega m, sin}^2)^{\frac{1}{2}}/(V_{2\omega m, cos}^2 + V_{2\omega m, sin}^2)^{\frac{1}{2}} = |\tan\phi s|$$

$$|J_1(h)/J_2(h)| \times \quad (28b)$$
$$(V_{2\omega m, cos}^2 + V_{2\omega m, sin}^2)^{\frac{1}{2}}/(V_{\omega m, cos}^2 + V_{\omega m, sin}^2)^{\frac{1}{2}} = |\cot\phi s|.$$

The formulas (28a) and (28b) correspond to the formulas (5a) and (5b), respectively.

The computed values expressed by the formulas (28a) and (28b) correspond to the curves 103 and 104 shown in FIG. 4a, respectively. The angular velocity computation unit 130 carries out the computation as shown in FIGS. 4b and 4c with respect to the phase difference $\phi$ s based on the eighth digital signal 129 corresponding to the range of the phase difference $\phi$ s determined by the logic discrimination of FIG. 3b and the computed values 103 and 104 shown in FIG. 4a, and outputs an output signal corresponding to the computed value, i.e., an eleventh digital signal 133 proportional to the input angular velocity. Note, in FIGS. 4b and 4c, $\phi$ s equals to $[K\omega - 2\pi nL(f_{A1} - f_{A2})/C]$.

As explained above, the angular velocity computation unit 130 executes the computation shown by the formulas (28a), (28b) based on the output 126 of the first digital multiplication unit 120a shown by the formulas (20),(21), the output 127 of the second digital multiplication unit 120b shown by the formulas (23),(24) and the output 132 of the phase modulation index computation unit 131 shown by the formula (27) and, based on the computed values and the output 129 (of the polarity discrimination unit 128) corresponding to the range of the phase difference $\phi$ s determined by the logic discrimination of FIG. 3b, carries out the computation as shown in FIGS. 4b and 4c to output the corresponding signal as a gyro output signal.

Therefore, it is possible to obtain the gyro output signal in accurate proportion to the input angular velocity and extend the detectable input angular velocity to the range corresponding to $\pm \pi$ [rad] for the phase difference $\phi$ s based on Sagnac effect. Also, it is possible to perfectly remove a possibility in that the linearity and scale factor stability of the gyro are deteriorated due to a fluctuation in the quantity $P_0$ of incoherent light of the light beam incident on the photoelectric transducing circuit 7, a fluctuation in the phase modulation index h, or a fluctuation in the phase differences $\psi_{\omega m}', \psi_{2\omega m}'$ between the components of fm, 2 fm taken out of the photoelectric output signal 8 and the output digital signals 124,125 of the cosine/sine generation unit 123.

Also, the signal components of fm, 2 fm and 4 fm taken out of the photoelectric output signal 8 by the first to third heterodyne mixers 109a to 109c are converted by the A/D converter 118 to the digital signal 119 and then the converted signal 119 is digitally demodulated by the digital multiplication units 120a and 120b. Accordingly, it is possible to prevent an occurrence of offset voltage due to an analog demodulation as seen in the prior art. This contributes to an improvement in the bias stability of the gyro.

Furthermore, the reference signal generating circuit 136 outputs the analog signal 208 having an output amplitude corresponding to the ninth digital signal 134 which keeps constant the value shown by the formula (26) output from the phase modulation index computation unit 131. The analog signal 208 forms the drive signal of the phase modulator. At this time, the modulation index h of the phase modulator 5 is kept constant by forcibly changing the maximum phase shift $\Phi$ m of the phase modulator 5 by the amplitude of the drive signal 208. As a result, the linearity and scale factor stability of the gyro can be improved.

Next, a method of driving a phase modulator used in an optical fiber gyro will be explained with reference to FIGS. 8 and 13.

Figure 8:
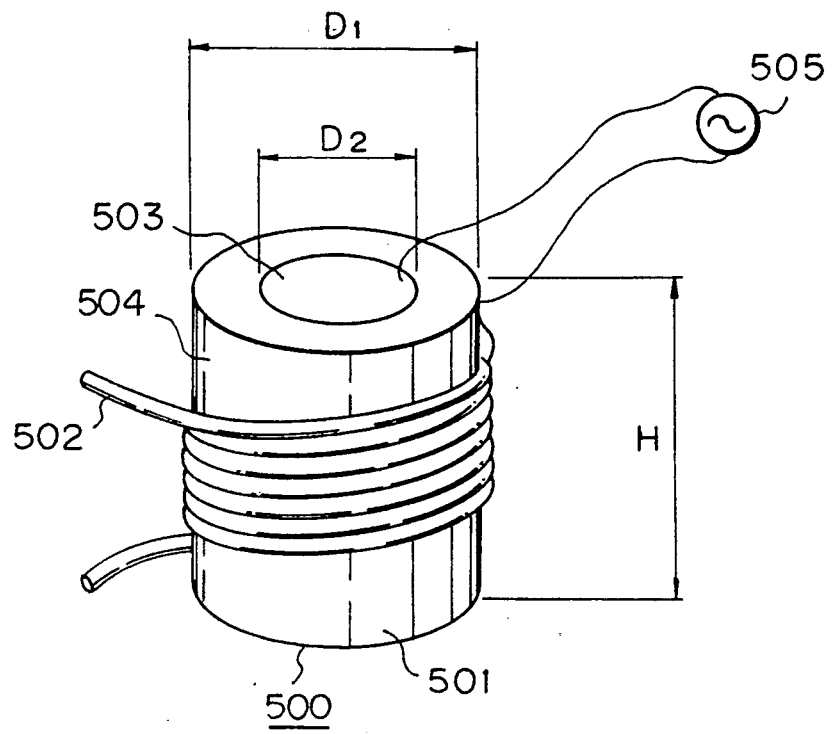
FIG. 8 is a perspective view showing a phase modulator.

FIG. 8 illustrates a constitution of a known phase modulator for an optical fiber gyro.

The illustrated phase modulator 500 is constituted by a cylindrical member 501 consisting of piezoelectric material, an optical fiber 502 closely wound on the outer circumferential surface of the cylindrical member 501, and electrodes 503 and 504 formed on the inner and outer circumferential surface of the cylindrical member 501, respectively. The phase modulator 500 is driven by applying alternating current voltage to the electrodes 503, 504 by means of a drive source 505.

The phase modulator 500 is employed in various kinds of optical fiber gyros and, for example, applied to the phase modulation optical fiber gyro shown in FIG. 6.

As described before, the photoelectric output signal 8 is input to the synchronization detecting circuit 9' together with the phase modulator drive signal 208 output from the oscillator 209 (corresponding to the drive source 505). The synchronization detecting circuit 9' detects a component of the same angular frequency as the drive angular frequency $\omega$ m for the phase modulator. In this case, the output signal 258 of the synchronization detecting circuit 9' is proportional to $2 P_0 J_1(h) \sin(K\omega)$ and forms the gyro output.

Figure 9:
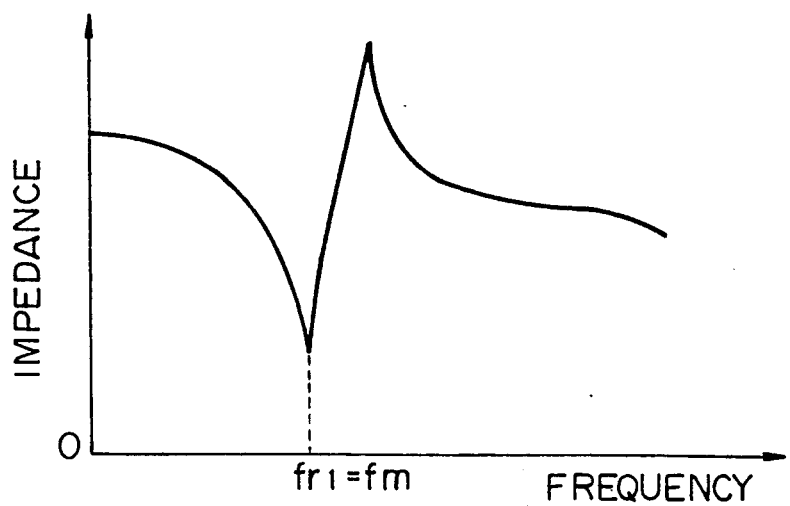
FIG. 9 is a graph showing an impedance characteristic with respect to a drive frequency, for explaining a prior art phase modulator driving method.

According to the prior art driving method, the phase modulator 500 is phase-modulated at a resonant frequency in a radial direction of the cylindrical member 501. An example of the form is shown in FIG. 9, which illustrates an impedance characteristic of the cylindrical member 501 with respect to the phase modulator drive frequency. In the illustration, $fr_1$ denotes a resonant frequency in the radial direction and fm denotes a phase modulation frequency.

In general, the piezoelectric material constituting the cylindrical member 501 consists of piezoelectric ceramics of ($Pb[ZrTi]O_3$) or the like, or ferroelectrics of ($LiNbO_3$) or the like. Where the piezoelectric member is constituted in the form of a cylinder, the resonant frequency $fr_1$ in the radial direction is expressed by the following formula;

$$fr_1 \propto 1/[(D_1+D_2)/2][Hz] \qquad (31)$$

Also, a maximum phase shift $\Phi$ m of the known phase modulator 500 is expressed by the following formula;

$$\Phi m = 2\pi k_0 n V d N[d_{33}+(D/2T)d_{31}] \cdot Q \times (1-[P_{12}-(P_{11}+P_{12})\gamma]n^2/2)[rad] \qquad (32)$$

Note, $k_0$ indicates the number of waves($=2\pi/\lambda$); Vd an application voltage; N the number of turns of the optical fiber; $d_{33}$ a constant of electrostriction in a direction of the voltage application; $d_{31}$ a constant of electrostriction in a direction perpendicular to that of the voltage application; D a constant of $(D_1+D_2)/2$; T a constant of $(D_1-D_2)/2$; Q a Q value; Pij a constant of photoelectricity of the optical fiber; and $\gamma$ a Poisson ratio of the optical fiber.

Also, the phase modulation in the optical fiber gyro is carried out at a frequency of $\frac{1}{2}\tau$ to remove bias error occurring due to a phase modulation by harmonics having a frequency twice the phase modulation frequency. Note, $\tau$ indicates a delay time in the optical propagation path and is expressed by the following formula;

$$\tau = nL/C[sec] \qquad (33)$$

$\frac{1}{2}\tau$ is hereinafter referred to as an eigenfrequency of the optical propagation path.

In the prior art phase modulator 500, a diameter of the cylindrical member 501 must be selected to be small to conform the resonant frequency $fr_1$ in the radial direction to the eigenfrequency of the optical propagation path. For example, when a length of the optical fiber in the optical propagation path 6 (see FIG. 6) is 600 mm, $(D_1+D_2)/2$ must be selected to be about 5 mm.

Accordingly, when the optical fiber 502 is wound on the cylindrical member 501 having such a small diameter, a radiation loss occurs in the optical fiber 502 resulting in a decrease in a quantity of light. This leads to a deterioration in a signal to noise (S/N) ratio of the photoelectric output signal 8 (see FIG. 6).

Also, since a dimension of the cylindrical member includes an error in manufacture, it is very difficult to conform the resonant frequency $fr_1$ in the radial direction to the eigenfrequency of the optical propagation path.

Furthermore, when the phase modulator is driven at the resonant frequency $fr_1$ in the radial direction of the cylindrical member 501, a possibility occurs in that the Q value fluctuates by external force and ambient temperature and thus the maximum phase shift $\Phi$ m and phase modulation index h are changed. This causes a fluctuation in the scale factor of the gyro output.

Next, the phase modulator driving method according to an embodiment of the present invention will be explained with reference to FIG. 10.

Figure 10:
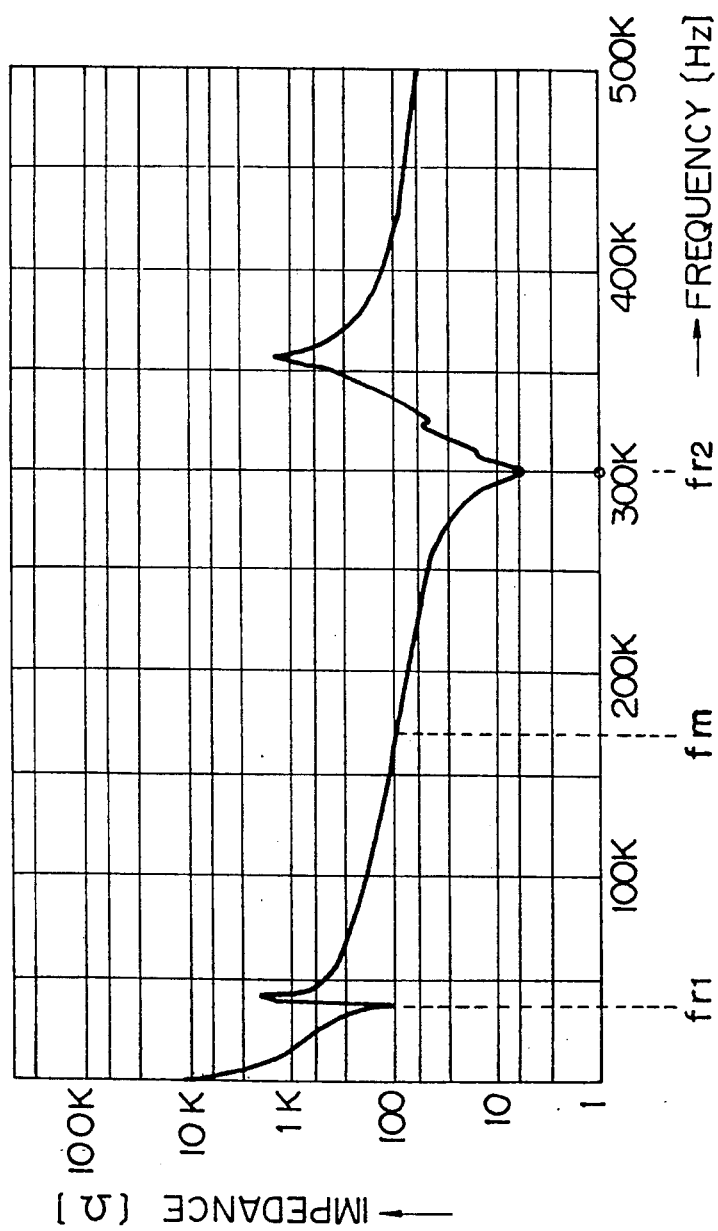
FIG. 10 is a graph showing an impedance characteristic with respect to a drive frequency, for explaining the phase modulator driving method according to an embodiment of the present invention.

FIG. 10 illustrates an impedance characteristic of a cylindrical member constituting a phase modulator with respect to the phase modulator drive frequency. Note, the present embodiment is applied to the phase modulator 500 shown in FIG. 8. In the illustration, $fr_1$ denotes a resonant frequency in the radial direction of the cylindrical member 501; $fr_2$ a resonant frequency in the axial direction thereof; and fm a phase modulation frequency.

In the present embodiment, the phase modulator 500 is driven in a non-resonance region between the resonant frequency $(fr_1)$ in the radial direction of the cylindrical member 501 consisting of piezoelectric material and that $(fr_2)$ in the axial direction thereof, and at the eigenfrequency $\frac{1}{2}\tau$ of the optical propagation path. Note, $\tau$ indicates a delay time in the optical propagation path. By this driving, the cylindrical member 501 is expanded and contracted in the radial direction thereof and, accordingly, the single mode polarization-preserving optical fiber 502 wound on the outer circumferential surface of the cylindrical member 501 is also expanded and contracted. As a result, a length of the optical path is changed according to a frequency corresponding to the driving frequency and, since the speed of light is constant, the phase of light is modulated.

As explained above, since the phase modulation is carried out in the non-resonance region between each resonant frequency $fr_1, fr_2$ in the radial and axial directions of the cylindrical member 501 of piezoelectric material, it becomes unnecessary to conform the resonant frequency $fr_1$ in the radial direction to the eigenfrequency of the optical propagation path. Accordingly, it is possible to select a large dimension as the diameter of the cylindrical member 501 and reduce the radiation loss in the optical fiber 502. This contributes to an improvement in the S/N ratio of the photoelectric output signal.

Additionally, the resonant frequency $fr_1$ in the radial direction is determined with respect to a certain outer diameter of the cylindrical member 501. The outer diameter is selected to be a dimension at which, when the optical fiber 502 is wound on the cylindrical member 501, a radiation loss is hard to occur or substantially does not occur in the optical fiber 502. In the present example, the outer diameter is 20 mm or more.

Also, the resonant frequency $fr_2$ in the axial direction is selected to be higher than the eigenfrequency $\frac{1}{2}\tau$ of the optical propagation path, i.e., the phase modulation frequency fm, by a difference $(fm-fr_1)$ between the eigenfrequency and the resonant frequency $fr_1$ in the radial direction, or more.

Since a difference between each resonant frequency $fr_1, fr_2$ and the phase modulation frequency fm is selected to be approximately 100 KHz or more (see FIG. 10), it is possible to keep each deviation of the resonant frequencies $fr_1, fr_2$ due to errors in manufacture within the range of five or six KHz. Therefore, irrespective of errors in manufacture of the cylindrical member 501, it is possible to drive the phase modulator at the eigenfrequency of the optical propagation path.

Figure 11:
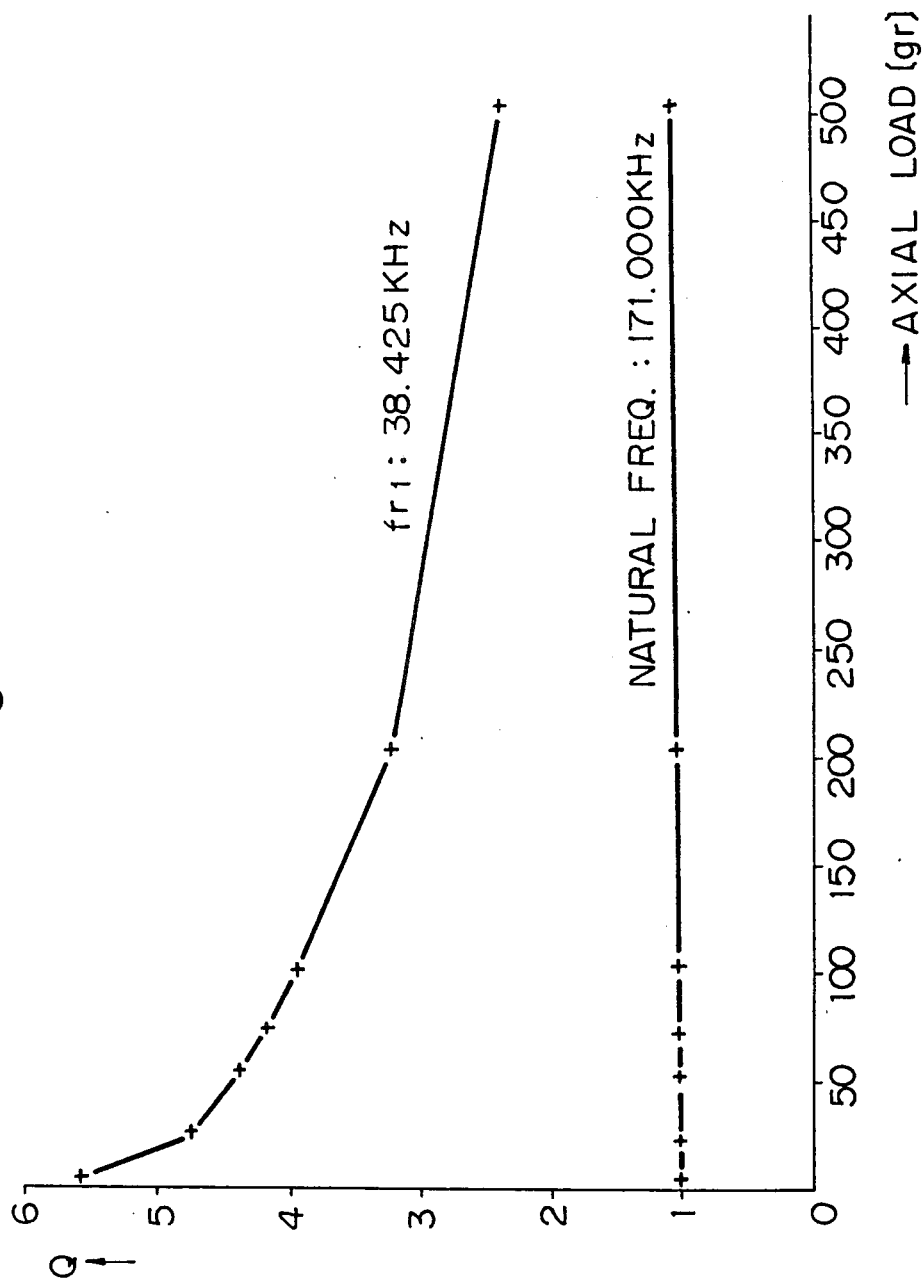
FIGS. 11 to 13 are graphs showing the relation between the axial load, radial load and ambient temperature of the phase modulator, respectively, and the Q value based on the driving method of FIG. 10.
Figure 12:
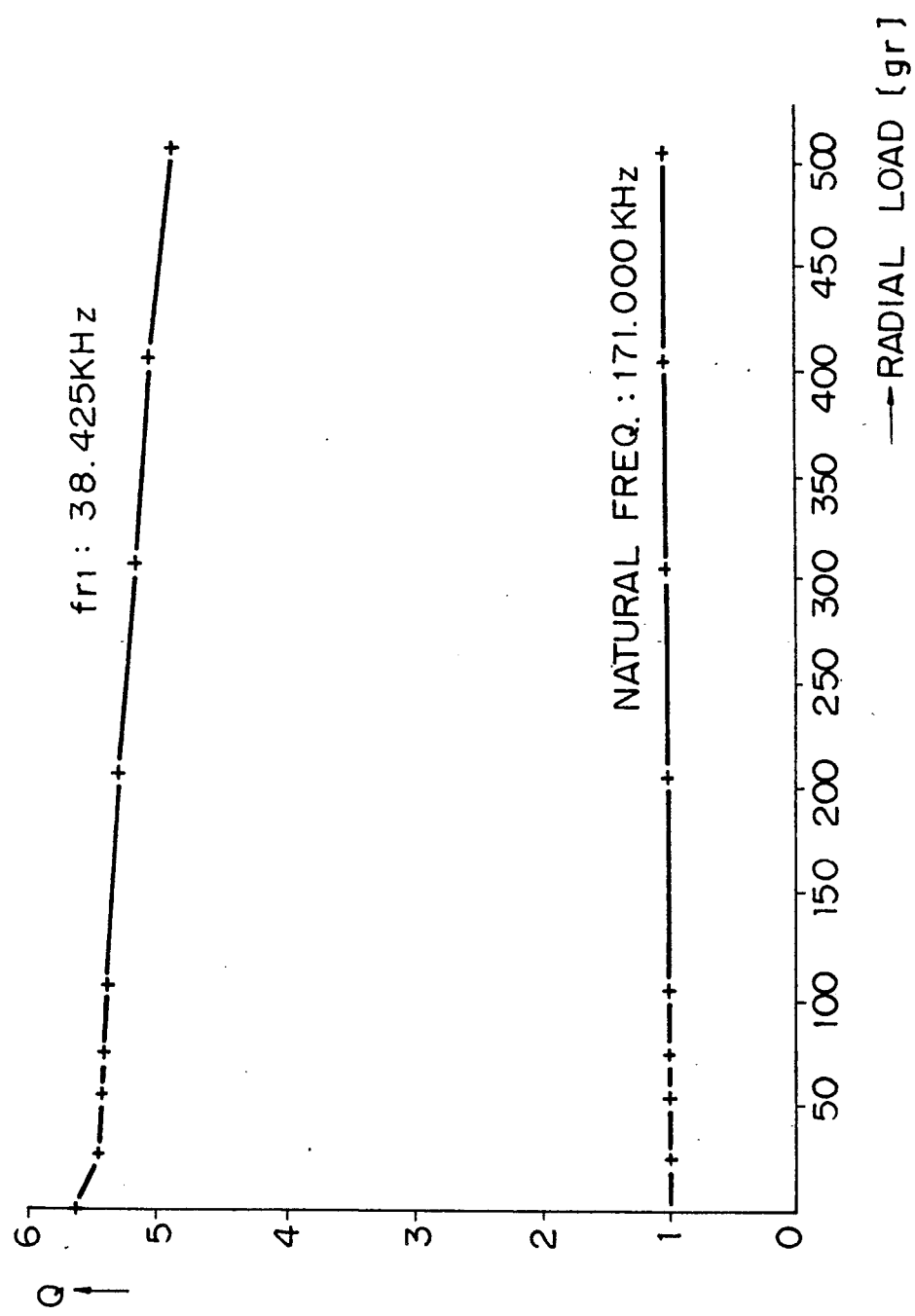
Figure 13:
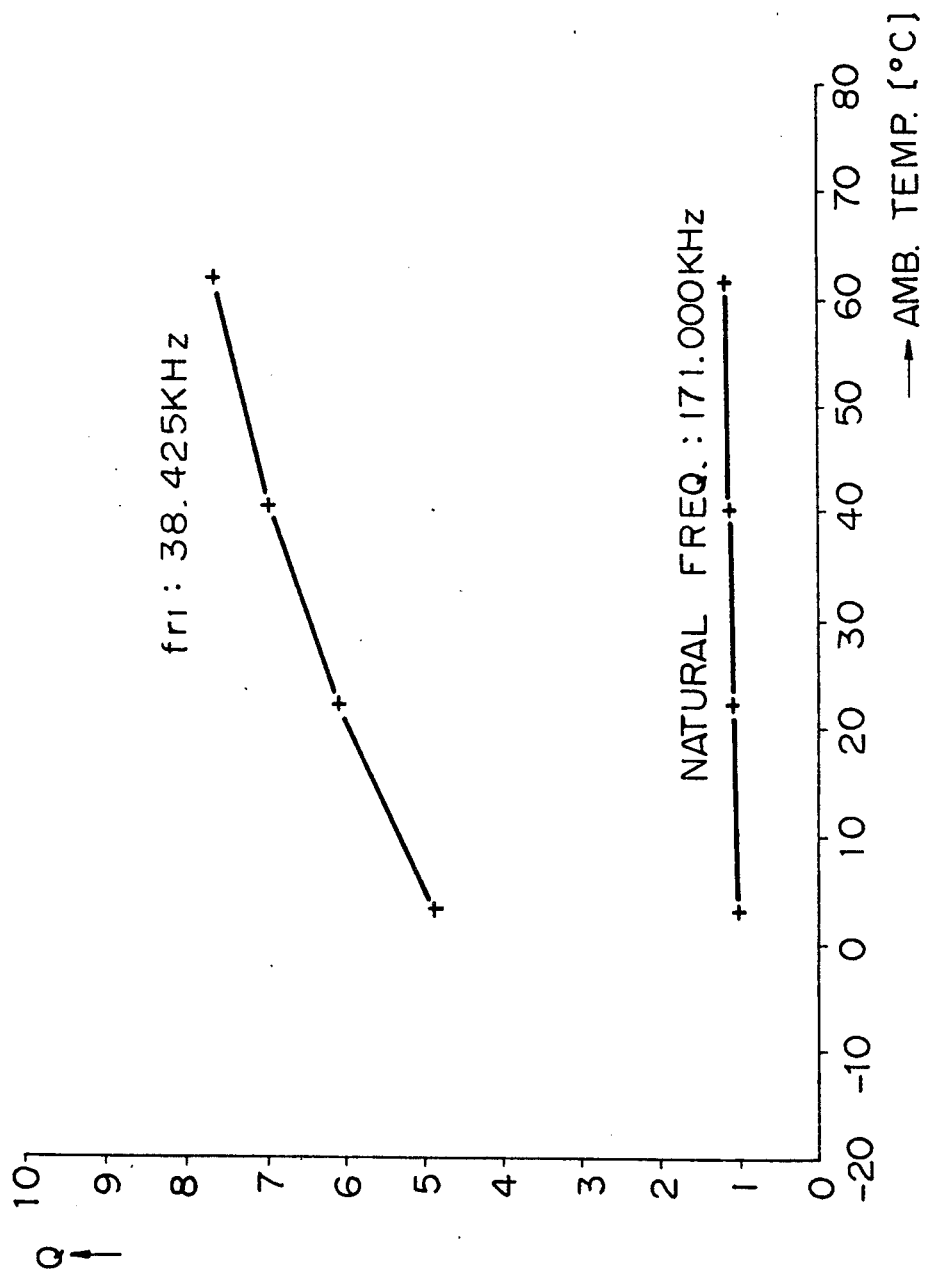

FIGS. 11 to 13 show examples of the Q value with respect to the axial load, radial load and ambient temperature of the phase modulator, respectively. These are data obtained from the cylindrical member 501 consisting of $(Pb[ZrTi]O_3)$ and having the outer diameter of 25 mm, inner diameter of 23 mm and height of 5 mm. Also, the phase modulation frequency fm is equal to the eigenfrequency 171 KHz for the optical fiber length 600 mm.

First, referring to FIG. 11, as to the resonant frequency $fr_1$ in the radial direction, a change of 58.6% is caused between the Q value for the axial load of 0 and that for the axial load of 500 [gr]. As to the eigenfrequency in the non-resonance region, however, only a change of 1.6% is caused between the Q value for the axial load of 0 and that for the axial load of 500 [gr].

In a like manner, referring to FIG. 12, as to the resonant frequency $fr_1$, a change of 14.0% is caused between the Q value for the radial load of 0 and that for the radial load of 500 [gr]. As to the eigenfrequency, however, only a change of 1.0% is caused between the Q value for the radial load of 0 and that for the radial load of 500 [gr].

Next, referring to FIG. 13, as to the resonant frequency $fr_1$, the Q value indicates a temperature coefficient of 0.96%/°C. for the ambient temperature. As to the eigenfrequency, however, the Q value indicates a temperature coefficient of only 0.25%/°C.

Therefore, by driving the phase modulator in the non-resonance region, it is possible to reduce a fluctuation in the Q value due to changes in the external force and ambient temperature, compared with the prior art in which the phase modulation is carried out at the resonant frequency in the radial direction. As a result, the phase modulation index is stabilized and thus an optical fiber gyro having a stable scale factor is obtained.

Although the present invention has been disclosed and described by way of a number of embodiments, it is apparent to those skilled in the art that other embodiments and modifications of the present invention are possible without departing from the spirit or essential features thereof.

We claim:

1. An optical gyro comprising:
    an optical propagation path in cooperation with a rotation axis, for propagating a pair of light beams therethrough simultaneously clockwise and counterclockwise, respectively, and causing a phase difference of light based on Sagnac effect;
    an optical system optically coupled to said optical propagation path, for effecting a generation, a distribution or coupling, a polarization, a frequency shift and a phase modulation of light beams and transducing a light beam indicating the phase difference of light into a corresponding electric signal to output a photoelectric output signal; and
    a signal processing circuit operatively connected to said optical system, for taking signal components of a same frequency as, a frequency twice and a frequency four times a phase modulation frequency out of said photoelectric output signal and digitally processing the signal components to generate drive signals for said frequency shift and phase modulation and obtain a signal proportional to an angular velocity with respect to the rotation axis.

2. An optical gyro as set forth in claim 1, wherein said signal processing circuit comprises:
    a first synchronization detecting circuit having a function of automatically changing sensitivity for synchronization detection, for outputting information on the sensitivity as a first digital signal and taking a signal component of a same frequency as the phase modulation frequency out of said photoelectric output signal to output first and second analog signals;
    a second synchronization detecting circuit for taking a signal component of a frequency twice the phase modulation frequency out of said photoelectric output signal to output third and fourth analog signals;
    a third synchronization detecting circuit for taking a signal component of a frequency four times the phase modulation frequency out of said photoelectric output signal to output fifth and sixth analog signals;
    an analog/digital converter for converting said first to sixth analog signals to a second digital signal;
    a computation/control circuit responsive to the first and second digital signals, for outputting a third digital signal to keep constant a ratio of absolute values of each amplitude of the signal components of frequencies twice and four times the phase modulation frequency, fourth and fifth digital signals to compute a ratio of each absolute value of the signal components of frequencies the same as and twice the phase modulation frequency with respect to several sections divided in a range of $-\pi[\text{rad}] \sim +\pi[\text{rad}]$ of the phase difference based on Sagnac effect to make zero and make the sum thereof constant, a sixth digital signal to control a data fetching from said analog/digital converter, and a seventh digital signal proportional to said angular velocity;
    a circuit for generating a clock signal;
    a first direct synthesizer for outputting a seventh analog signal in frequency synchronization with said clock signal, having an amplitude corresponding to the third digital signal and connected to the first synchronization detecting circuit, said seventh analog signal forming a drive signal for said phase modulation, an eighth analog signal having a frequency twice the seventh analog signal and connected to the second synchronization detecting circuit, and a ninth analog signal having a frequency four times the seventh analog signal and connected to the third synchronization detecting circuit;
    a second direct synthesizer for outputting a tenth analog signal in frequency synchronization with said clock signal and having a frequency corresponding to the fourth digital signal;
    a third direct synthesizer for outputting an eleventh analog signal in frequency synchronization with said clock signal and having a frequency corresponding to the fifth digital signal;

a high frequency oscillator for outputting a first high frequency analog signal;

a first single side band generating circuit responsive to the first high frequency analog signal and the tenth analog signal, for outputting a second high frequency analog signal having a frequency of the sum of frequencies of the both signals and forming a drive signal for said frequency shift; and a second single side band generating circuit responsive to the first high frequency analog signal and the eleventh analog signal, for outputting third high frequency analog signal having a frequency of the sum of frequencies of the both signals and forming another drive signal for said frequency shift.

3. An optical gyro as set forth in claim 2, further comprising an isolation amplifier for electrically isolating said first to sixth analog signals to transmit to said analog/digital converter.

4. An optical gyro as set forth in claim 2, further comprising a buffer amplifier responsive to said seventh analog signal and outputting the drive signal for said phase modulation.

5. An optical gyro as set forth in claim 2, wherein said computation/control circuit comprises:

means for executing a logic discrimination of the phase of light based on signs or polarities of said first and second digital signals with respect to ranges described below;

$$-\pi < \sim < \pi/2, \quad -\pi/2,$$
$$-\pi/2 < \sim < 0, \quad 0,$$
$$0 < - < \pi/2, \quad \pi 2,$$
$$\pi/2 < \sim < \pi[rad], \text{ and}$$

means for computing said phase of light based on a result of the logic discrimination and said first and second digital signals with respect to ranges described below;

$$-\pi < \sim < -3/4\,\pi, \quad -3/4\,\pi \leq \sim < -\pi/2$$
$$-\pi/2 \leq \sim < -\pi/4, \quad -\pi/4 \leq - 0,$$
$$0 \leq - \leq \pi/4, \quad \pi/4 < \sim \leq \pi/2,$$
$$\pi/2 < \sim \leq 3/4\,\pi, \quad 3/4\pi < \sim < \pi[rad].$$

6. An optical gyro as set forth in claim 5, wherein each of said first and second single side band generating circuits comprises:

a divider responsive to the first high frequency analog signal, for dividing the signal into two in-phase signals having an equal power;

a first hybrid circuit responsive to a fourth high frequency analog signal, for dividing the signal into two signals having an equal power, one of the signals being in-phase with the fourth high frequency analog signal and another thereof being phase-shifted by 90° therefrom;

a first mixing circuit for receiving one of the output signals of the divider and the in-phase output signal of the first hybrid circuit and effecting a frequency mixing;

a second mixing circuit for receiving another of the output signals of the divider and the phase-shifted output signal of the first hybrid circuit and effecting a frequency mixing;

a second hybrid circuit for receiving an output signal of the first mixing circuit at a 0° port and an output signal of the second mixing circuit at a 90° port and outputting a twelfth analog signal having a difference between each frequency of the first and fourth high frequency analog signals;

a third mixing circuit for receiving said tenth or eleventh analog signal and the twelfth analog signal and effecting a frequency mixing;

a voltage comparing circuit for comparing an output signal of the third mixing circuit with a reference voltage; and a voltage controlled oscillating circuit for outputting said fourth high frequency analog signal having a frequency proportional to an output signal of the voltage comparing circuit and having a frequency of the sum of each frequency of the tenth or eleventh analog signal and the first high frequency analog signal, said fourth high frequency analog signal corresponding to said second or third high frequency analog signal as the drive signal for said frequency shift.

7. An optical gyro as set forth in claim 6, further comprising a radio frequency amplifying circuit for amplifying said fourth high frequency analog signal to form said second or third high frequency analog signal.

8. An optical gyro as set forth in claim 1, wherein said optical system comprises;

a light source for emitting a first light beam;

a first optical distributor and coupler for distributing the first light beam into second and third light beams;

a polarizer for transmitting only a polarized component of the second light beam;

a second optical distributor and coupler for distributing the polarized component of the second light beam into fourth and fifth light beams, and coupling incident light beams to form a sixth light beam, said fourth and fifth light beams corresponding to the pair of light beams to be propagated through the optical propagation path;

a pair of acousto-optic modulators for effecting the frequency shift for the fourth and fifth light beams, respectively;

a phase modulator for effecting the phase modulation for the fourth and fifth light beams; and a photoelectric transducing circuit for transducing one of seventh and eighth light beams into said photoelectric output signal, said seventh and eighth light beams being distributed by the first optical distributor and coupler based on the sixth light beam transmitted through the polarizer.

9. An optical gyro as set forth in claim 8, wherein said optical propagation path is constituted by an optical fiber.

10. An apparatus for effecting a signal processing for an optical gyro comprising:

a first heterodyne mixer for taking a signal component of a same frequency as a drive frequency fm of a phase modulator constituting the optical gyro out of a phase-modulated photoelectric output signal indicating a rotation angular velocity and converting the signal component to a signal of a frequency Δfm to output a first analog signal;

a second heterodyne mixer for taking a signal component of a frequency 2fm out of the photoelectric output signal and converting the signal component to a signal of the frequency Δfm to output a second analog signal;

a third heterodyne mixer for taking a signal component of a frequency 4fm out of the photoelectric output signal and converting the signal component to a signal of the frequency Δfm to output a third analog signal;
a fourth heterodyne mixer for converting a fifth analog signal having a same frequency as a drive signal for the phase modulator and synchronizing in phase therewith to a signal of the frequency Δfm to output a fourth analog signal;
an analog/digital converter for converting said first to third analog signals to a first digital signal;
a timing pulse generation means for outputting a second digital signal in phase synchronization with said fourth analog signal and connected to the analog/digital converter, and a third digital signal in phase synchronization with said fourth analog signal;
a cosine/sine generation means for outputting fourth and fifth digital signals in phase synchronization with the third digital signal and shifted in phase by 90° from each other;
a first digital multiplication means for effecting a multiplication of the first and fourth digital signals to output a sixth digital signal;
a second digital multiplication means for effecting a multiplication of the first and fifth digital signals to output a seventh digital signal;
a polarity discrimination means for discriminating a polarity of said rotation angular velocity based on the sixth and seventh digital signals to output an eighth digital signal;
a phase modulation index computation means responsive to the sixth and seventh digital signals, for outputting a ninth digital signal to keep constant a ratio of each amplitude of the signal components of frequencies 2fm and 4fm taken out of the photoelectric output signal, and a tenth digital signal corresponding to the phase modulation index;
an angular velocity computation means for outputting an eleventh digital signal proportional to said rotation angular velocity based on the sixth, seventh, eighth and tenth digital signals; and
a reference signal generating circuit for outputting a sixth analog signal having an amplitude corresponding to the ninth digital signal and connected to the phase modulator, the fifth analog signal in synchronization in frequency and phase with the sixth analog signal and connected to the fourth heterodyne mixer, a twelfth digital signal in synchronization in frequency and phase with the sixth analog signal and connected to the first and fourth heterodyne mixers, a thirteenth digital signal in synchronization in frequency and phase with the sixth analog signal and connected to the second heterodyne mixers, and a fourteenth digital signal in synchronization in frequency and phase with the sixth analog signal and connected to the third heterodyne mixers.

11. An apparatus as set forth in claim 10, wherein said timing pulse generation means, cosine/sine generation means, first and second digital multiplication means, polarity discrimination means, phase modulation index computation means and angular velocity computation means are constituted by a digital signal processor which executes various operations based on software processing.

12. An apparatus as set forth in claim 11, wherein each of said first and second digital multiplication means comprises:

means for effecting a multiplication between the first digital signal and the fourth or fifth digital signal;
a digital filter means for taking a direct current component out of a result of the multiplication; and
means for outputting the direct current component as the sixth or seventh digital signal.

13. An apparatus as set forth in claim 12, wherein said polarity discrimination means comprises means responsive to the sixth and seventh digital signals, for executing a logic discrimination of a phase difference of light proportional to said rotation angular velocity based, on a sign of a component corresponding to the component of the same frequency as the drive frequency and a sign of a component corresponding to one of the components of the frequencies twice and four times the drive frequency with respect to ranges described below;

$$-\pi < \sim < -\pi/2, \quad -\pi/2,$$
$$-\pi/2 < \sim < 0, \quad 0,$$
$$0 < \sim < \pi/2, \quad \pi/2,$$
$$\pi/2 < \sim < \pi[\text{rad}].$$

14. An apparatus as set forth in claim 12, wherein said angular velocity computation means comprises means responsive to the sixth and seventh digital signals, for computing said phase difference of light proportional to said rotation angular velocity based on components corresponding to the frequencies the same as and twice the drive frequency and the eighth and ninth digital signals with respect to one of ranges described below;

$$-\pi < \sim < -3/4\,\pi, \quad -3/4\,\pi \leq \sim < -\pi/2,$$
$$-\pi/2 \leq \sim < -\pi/4, \quad -\pi/4 \leq \sim 0,$$
$$0 \leq \sim \leq \pi/4, \quad \pi/4 < \sim \leq \pi/2,$$
$$\pi/2 < \sim \leq 3/4\,\pi, \quad 3/4\pi < \sim < \pi[\text{rad}],$$

and $$-\pi < \sim < -\pi/2, \quad -\pi/2,$$
$$-\pi/2 < \sim < 0, \quad 0,$$
$$0 < \sim < \pi/2, \quad \pi/2,$$
$$\pi/2 < \sim < \pi[\text{rad}],$$

and outputting the eleventh digital signal proportional to said rotation angular velocity.

15. A signal processing apparatus for an optical gyro in which light is propagated simultaneously clockwise and counterclockwise through an optical propagation path in cooperation with a rotation axis and then a phase difference of the light based on Sagnac effect is detected to obtain a photoelectric output signal, said signal processing apparatus comprising:

a first synchronization detecting circuit having a function of automatically changing sensitivity for synchronization detection, for outputting information on the sensitivity as a first digital signal and taking a signal component of a same frequency as the phase modulation frequency out of said photoelectric output signal to output first and second analog signals;
a second synchronization detecting circuit for taking a signal component of a frequency twice the phase modulation frequency out of said photoelectric output signal to output third and fourth analog signals;
a third synchronization detecting circuit for taking a signal component of a frequency four times the phase modulation frequency out of said photoelectric output signal to output fifth and sixth analog signals;

an analog/digital converter for converting said first to sixth analog signals to a second digital signal;

a computation/control circuit responsive to the first and second digital signals, for outputting a third digital signal to keep constant a ratio of absolute values of each amplitude of the signal components of frequencies twice and four times the phase modulation frequency, fourth and fifth digital signals to compute a ratio of each absolute value of the signal components of frequencies the same as and twice the phase modulation frequency with respect to several sections divided in a range of $-\pi[rad] \sim +\pi[rad]$ of the phase difference based on Sagnac effect to make zero and make the sum thereof constant, a sixth digital signal to control a data fetching from said analog/digital converter, and a seventh digital signal proportional to said angular velocity;

a circuit for generating a clock signal;

a first direct synthesizer for outputting a seventh analog signal in frequency synchronization with said clock signal, having an amplitude corresponding to the third digital signal and connected to the first synchronization detecting circuit, said seventh analog signal forming a drive signal for a phase modulation control, an eighth analog signal having a frequency twice the seventh analog signal and connected to the second synchronization detecting circuit, and a ninth analog signal having a frequency four times the seventh analog signal and connected to the third synchronization detecting circuit;

a second direct synthesizer for outputting a tenth analog signal in frequency synchronization with said clock signal and having a frequency corresponding to the fourth digital signal;

a third direct synthesizer for outputting an eleventh analog signal in frequency synchronization with said clock signal and having a frequency corresponding to the fifth digital signal;

a high frequency oscillator for outputting a first high frequency analog signal;

a first single side band generating circuit responsive to the first high frequency analog signal and the tenth analog signal, for outputting a second high frequency analog signal having a frequency of the sum of frequencies of the both signals and forming a drive signal for a frequency shift control; and a second single side band generating circuit responsive to the first high frequency analog signal and the eleventh analog signal, for outputting third high frequency analog signal having a frequency of the sum of frequencies of the both signals and forming another drive signal for the frequency shift control.

16. A method of driving a phase modulator used in an optical gyro, wherein the phase modulator is formed by closely winding a single mode polarization preserving optical fiber on an outer circumferential surface of a cylindrical member consisting of piezoelectric material, the method comprising a step of:

driving the phase modulator in a non-resonance region between a first resonant frequency in a radial direction of the cylindrical member and a second resonant frequency in a axial direction thereof and at an eigenfrequency determined by a delay time in which light is propagated through the single mode polarization-preserving optical fiber.

17. A method as set forth in claim 16, wherein the first resonant frequency is selected with respect to a predetermined outer diameter of the cylindrical member, the predetermined outer diameter being a dimension at which a radiation loss substantially does not occur in the optical fiber.

18. A method as set forth in claim 16, wherein the second resonant frequency is selected to be higher than the eigenfrequency by a difference between the eigenfrequency and the first resonant frequency, or more.

* * * * *